(12) United States Patent
Yamada et al.

(10) Patent No.: US 10,921,256 B2
(45) Date of Patent: Feb. 16, 2021

(54) MULTI-SURFACE IMAGE ACQUISITION SYSTEM, OBSERVATION DEVICE, OBSERVATION METHOD, SCREENING METHOD, AND STEREOSCOPIC RECONSTRUCTION METHOD OF SUBJECT

(71) Applicant: HIROSAKI UNIVERSITY, Aomori (JP)

(72) Inventors: Katsuya Yamada, Aomori (JP); Kouki Ono, Aomori (JP); Yasushi Kojima, Aomori (JP); Terumasa Takamatsu, Aomori (JP)

(73) Assignee: Hirosaki University, Aomori (JP)

( * ) Notice: Subject to any disclaimer, the term of this patent is extended or adjusted under 35 U.S.C. 154(b) by 143 days.

(21) Appl. No.: 16/087,981

(22) PCT Filed: Mar. 30, 2017

(86) PCT No.: PCT/JP2017/013127
§ 371 (c)(1),
(2) Date: Sep. 24, 2018

(87) PCT Pub. No.: WO2017/170805
PCT Pub. Date: Oct. 5, 2017

(65) Prior Publication Data
US 2019/0113456 A1    Apr. 18, 2019

(30) Foreign Application Priority Data

Mar. 31, 2016  (JP) .............................. JP2016-070360

(51) Int. Cl.
*G02B 21/06*      (2006.01)
*G01N 21/64*      (2006.01)
(Continued)

(52) U.S. Cl.
CPC ......... *G01N 21/6458* (2013.01); *G01N 21/27* (2013.01); *G01N 21/64* (2013.01);
(Continued)

(58) Field of Classification Search
CPC ............... G01N 21/6458; G01N 21/27; G01N 2201/0638; G02B 5/04; G02B 21/0096;
(Continued)

(56) References Cited

U.S. PATENT DOCUMENTS 4,392,722 A  *  7/1983  Shirasaki ................. G02B 5/04
                                                                   359/281
4,699,516 A  *  10/1987  Bartz .................... G01N 15/088
                                                                   356/316

(Continued)

FOREIGN PATENT DOCUMENTS

CN     103502465 A     1/2014
CN     104781674 A     7/2015
(Continued)

OTHER PUBLICATIONS

Ono, Kouki et al., "Inexhaustible Charm of Spheroid, Three-Dimensional Cell Aggregate", Chemical Industry, vol. 66. No. 11, pp. 34-37 (2015) (and English Translation).

(Continued)

*Primary Examiner* — David P Porta
*Assistant Examiner* — Mamadou Faye
(74) *Attorney, Agent, or Firm* — Fay Sharpe LLP

(57) ABSTRACT

A multi-surface image acquisition system includes a multi-surface observation prism which includes one or more prisms and has a light path formed to collect surfaces in respective directions to be observed of a subject having a three-dimensional structure into one direction, in which a light path length is corrected by utilizing a difference in refractive index between glass and air to equalize a working (Continued)

distance of each surface. A light field camera expands a focal-depth adjustment range for two or more images focused on same plane through the prism. A three-dimensional subject can be observed in multiple directions at the same time, including an observation of cells.

23 Claims, 10 Drawing Sheets

(51) Int. Cl.

| | |
|---|---|
| G02B 21/12 | (2006.01) |
| G01N 21/27 | (2006.01) |
| G02B 21/00 | (2006.01) |
| G02B 5/04 | (2006.01) |
| G02B 21/36 | (2006.01) |
| G02B 21/16 | (2006.01) |
| G02B 21/26 | (2006.01) |

(52) U.S. Cl.
CPC ............ *G02B 5/04* (2013.01); *G02B 21/0096* (2013.01); *G02B 21/12* (2013.01); *G02B 21/16* (2013.01); *G02B 21/26* (2013.01); *G02B 21/361* (2013.01); *G02B 21/365* (2013.01); *G01N 2201/0638* (2013.01)

(58) Field of Classification Search
CPC ........ G02B 21/12; G02B 21/16; G02B 21/26; G02B 21/365
See application file for complete search history.

(56) References Cited

U.S. PATENT DOCUMENTS

| | | | | |
|---|---|---|---|---|
| 6,342,971 | B1* | 1/2002 | Hashizume | ............ G02B 5/04 349/5 |
| 7,723,703 | B2 | 5/2010 | Yamauchi et al. | |
| 7,724,456 | B2 | 5/2010 | Yamauchi et al. | |
| 8,619,177 | B2 | 12/2013 | Perwass et al. | |
| 8,986,656 | B2 | 3/2015 | Yamada et al. | |
| 9,958,450 | B2 | 5/2018 | Yamada et al. | |
| 10,001,487 | B2 | 6/2018 | Yamada et al. | |
| 10,288,604 | B2 | 5/2019 | Yamada et al. | |
| 10,509,041 | B2 | 12/2019 | Yamada et al. | |
| 10,551,387 | B2 | 2/2020 | Yamada et al. | |
| 2005/0052753 | A1* | 3/2005 | Kanai | ................ A61B 1/00172 359/642 |
| 2008/0091105 | A1* | 4/2008 | Weinbaum | ............... A61B 8/12 600/443 |
| 2009/0066936 | A1* | 3/2009 | Huang | ............... G01N 21/6458 356/73 |
| 2012/0176672 | A1* | 7/2012 | Cooper | ............. G02B 27/0025 359/385 |
| 2019/0064493 | A1* | 2/2019 | Truong | .............. G02B 21/0028 |

FOREIGN PATENT DOCUMENTS

| | | |
|---|---|---|
| CN | 106459126 A | 2/2017 |
| EP | 2 325 327 A1 | 5/2011 |
| EP | 2 244 484 B1 | 3/2012 |
| EP | 2 703 495 A1 | 3/2014 |
| EP | 2 905 620 A1 | 8/2015 |
| EP | 3 199 638 A1 | 8/2017 |
| JP | 05-060538 | 3/1993 |
| JP | 4118935 B2 | 7/2008 |
| JP | 4885489 B2 | 2/2012 |
| JP | 5411350 B2 | 2/2014 |
| JP | 5530126 B2 | 6/2014 |
| JP | 5682881 B2 | 3/2015 |
| JP | 6019500 B2 | 11/2016 |
| JP | 6327565 B2 | 5/2018 |
| JP | 6406715 B2 | 10/2018 |
| JP | 6566348 B2 | 8/2019 |
| JP | 6670503 B2 | 3/2020 |
| JP | 6721868 B2 | 7/2020 |
| WO | WO 2010/121637 A1 | 10/2010 |
| WO | WO 2016/035108 A1 | 3/2016 |

OTHER PUBLICATIONS

Perez, Carlos Cruz et al., "Calcium Neuroimaging in Behaving Zebrafish Larvae Using a Turn-Key Light Field Camera", Journal of Biomedical Optics, 20 (9), 096009 (2015).

Sasaki, Ayako et al., "Uptake of a Fluorescent L-Glucose Derivative 2-NBDLG into Three-Dimensionally Accumulating Insulinoma Cells in a Phloretin-Sensitive Manner", Human Cell, 29: pp. 37-45 (2016). (Erratum also attached).

Weber, M. et al., "Light Sheet Microscopy", Methods in Cell Biology., vol. 123, pp. 193-215 (2014).

Ono, Koki et al., "L-Glucose: Another Path to Cancer Cells", Cancers 2020, 12, 850, (Apr. 1, 2020) pp. 1-27.

* cited by examiner

FIGURE 18

Images of a fluorescence-emitting, three-dimensional target in water-filled multi-well dish. The target was viewed through Chrovit® prism and captured by a light field camera. Reconstructed total focus images are shown.

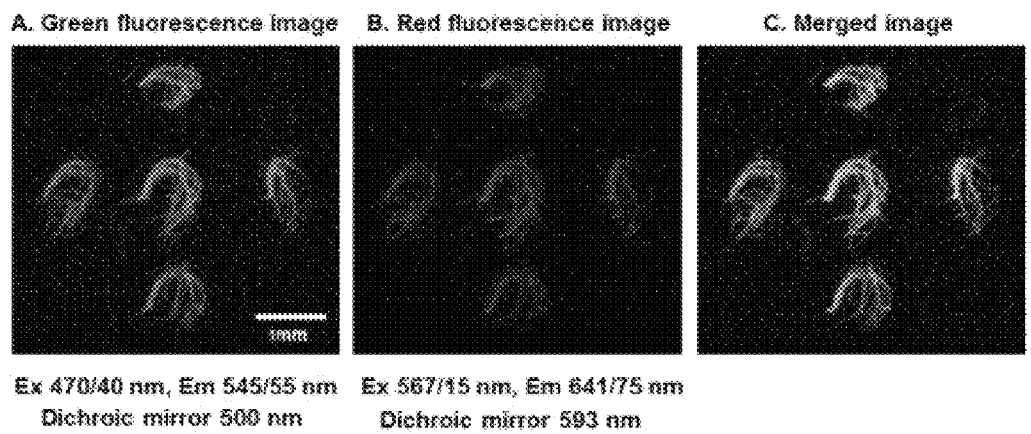

A. Green fluorescence image    B. Red fluorescence image    C. Merged image

Ex 470/40 nm, Em 545/55 nm    Ex 567/15 nm, Em 641/75 nm
Dichroic mirror 500 nm        Dichroic mirror 593 nm

FIGURE 19

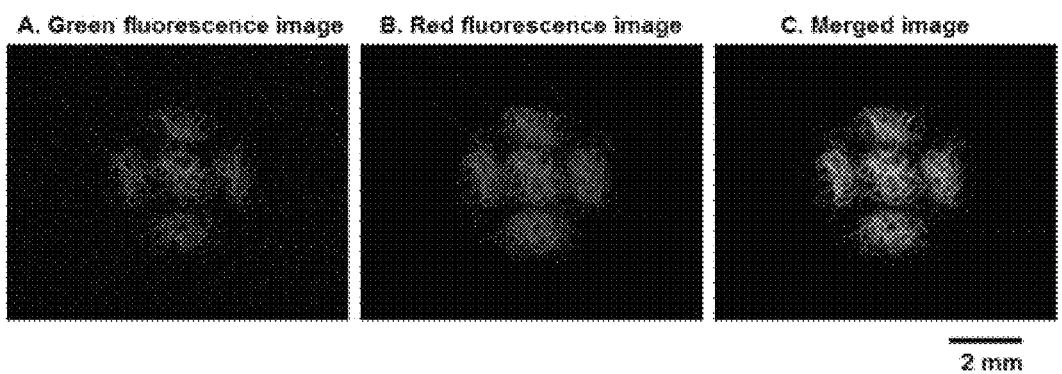

A. Green fluorescence image    B. Red fluorescence image    C. Merged image 2 mm \* Fluorescence measurements were done for the same fluorescent target in the same excitation light strength and the detector conditions.

MULTI-SURFACE IMAGE ACQUISITION SYSTEM, OBSERVATION DEVICE, OBSERVATION METHOD, SCREENING METHOD, AND STEREOSCOPIC RECONSTRUCTION METHOD OF SUBJECT

TECHNICAL FIELD

The present invention relates to a multiple-direction (sometimes referred to as multi-surface) image acquisition system, observation device, observation method, screening method and stereoscopic reconstruction method of an object, and particularly to a multi-surface image capturing system which can acquire information on an object observed in multiple directions at a time, thereby allowing quick grasping of structure in observations of an object having a three-dimensional structure, including cell observation.

BACKGROUND ART

In research utilizing a cancer cell, research on an iPS cell and ES cell, or brain research utilizing a neurosphere and the like, and further research in implant related field, there have been many reports that a three-dimensionally accumulated cell mass, or a laminated cell population exhibits properties closer to those of a cell which is present in a real living body, compared with a cell which grows two-dimensionally (Reference Literature 1). Further, as a method for observing the form and function of a cell population having three-dimensional stereoscopic structure, effectiveness of observation technique utilizing fluorescence is widely recognized (Reference Literature 2).

REFERENCE LITERATURES

1) Kouki Ono et al., "Chemical Industry", 66 (11): 34-37 (2015)
2) Sasaki, A., et al., Human Cell, 29:37-45 (2016)

However, when a great number of populations of cell cluster having a three-dimensional structure are present (as in, for example, scanning of a multi-well plate), upon performing fluorescence observation by using a conventional microscope, a laser microscope, a digital scanner, or the like, it takes much time for tomographic imaging, in which a tomographic picture of each cell cluster is captured one by one in a depth direction (Z axis direction) so that screening for quickly evaluating populations of cell mass which is present in large amount is actually difficult.

Although methods that utilize a deconvolution technique have been proposed, it cannot be said that their effects are sufficient considering long hours of computation which is actually required. Further, although real time deconvolution techniques which allow real time image acquisition have been provided as well, it cannot be said that they sufficiently cope with three-dimensional image capturing. Similar situation has become a problem to be solved urgently not only in the present example, but also in various situations where three-dimensional observation is required.

Further, in tomographic imaging, fluorescence fading occurs due to the fact that fluorescence excitation light needs to be radiated multiple times from the same direction. For example, it is also pointed out that when tomographic picture is started to be taken from a lower part of a cell mass, fluorescence has faded when reaching an upper part of the cell mass, and an image with sufficient quality cannot be acquired. A Light Sheet microscope for the purpose of mitigating the problem of fluorescence fading due to multiple radiation is also provided. However, observation by using this requires a special container, and so on, and therefore its uses are limited. Actually, there are drawbacks such as that it is not suitable to use it for screening of a large number of cell groups by using a normal widely used culture dish and a multi-well type microplate (Reference Literature 3).

Further, although a technique of observing from different angles by using multiple lenses has been presented as well, since it has restriction such as that a water immersion lens must be used, the technique is limited to observation concentrated to one point, and it is not suitable for quick observation of a large amount of cells (Reference Literature 3). Thus, prior arts which try to observe a three-dimensional structure from multiple directions by using multiple observation devices (lenses) are very expensive, and are accompanied by severe restrictions in observation.

By the way, the present inventors first succeeded in fluorescent imaging of a single cell in 2013 by applying a light field camera (Reference Literatures 4, 5, and 6) to fluorescence observation of live cell mass (spheroid) in a water solution. In contemporary time, attempts to combine with fluorescence observation have been made in foreign countries as well, and recently, it started to be reported by literatures although in a limited number (Reference Literature 7).

REFERENCE LITERATURES

3) Weber, M. et al., Methods Cell Biol. 123: 193-215 (2014)
4) European Patent No. EP2244484
5) U.S. Pat. No. 8,619,177
6) Japanese Patent No. 5411350
7) Perez, C C. et al., J. Biomed. Optics 20(9), 096009 (2015). DOI: 10.1117/1.JBO.20.9.096009

So far, technical proposals by patent application have been made on the three-dimensional image observation of cell or the like. For example, Patent Literature 1 to be described later discloses a three-dimensional cell image analysis system which allows accurate quantitative determination of fluorescence in a particular region in a cell while reducing operator's load, and accurate detection and determination of transition and localization of protein.

CITATION LIST

Patent Literature

[Patent Literature 1] Japanese Patent Laid-Open No. 2011-27543, "THREE-DIMENSIONAL CELL IMAGE ANALYSIS SYSTEM AND THREE-DIMENSIONAL CELL IMAGE ANALYSIS DEVICE USED THERETO" (Japanese Patent No. 5530126)
[Patent Literature 2] Japanese Patent No. 4118935, "MULTIDIRECTIONAL ELECTROMAGNETIC WAVE IRRADIATION SYSTEM OF WORKPIECE, LASER MATERIAL PROCESSING SYSTEM, AND ULTRAVIOLET-CURING TYPE RESIN BONDING METHOD" (corresponding patent: European Patent No. 1854576, U.S. Pat. No. 7,723,703)
[Patent Literature 3] Japanese Patent No. 4885489, "Dimension measurement device"
[Patent Literature 4] U.S. Pat. No. 7,724,456, "Multidirectional simultaneous observation optical system, image reading device, image reading method, and multidirectional simultaneous observation combined optical system" (corresponding patent: European Patent No. 1720003)

SUMMARY OF INVENTION

Technical Problem

However, as described above, when a large number of populations of cell cluster having a three-dimensional structure are present, and if fluorescence observation is performed by using a conventional microscope, a digital scanner, or the like, it takes much time for tomographic imaging, in which a tomographic picture of each cell cluster is captured one by one in a depth direction (Z axis direction) so that screening to quickly evaluate populations of a large amount of cell cluster is actually difficult. Similar situations have become a problem to be solved urgently not only for this example, but also in various aspects in which three-dimensional observation is needed. Although various attempts have been made as described above, effective solutions have not been achieved yet.

Meanwhile, one of the present applicants formerly invented a prism, Chrovit (registered trademark, hereinafter also referred to as a "Chrovit® prism"), which is effective mainly for inspection of the integrated circuits, the industrial products, and parts (Patent Literature 2, 3, and 4). This is an optical element for making each surface having different focal distance to have the same focal distance and the same magnification optically by utilizing the refractive index of glass, and can converge information on a stereoscopic subject observed in many directions into one direction, by combining bending of light path by utilizing a prism, thus allowing to perform simultaneous image processing of a plurality of surfaces by a single image camera. In other words, it can be said as a multi-surface simultaneous observation optical system, which is composed of one or more prisms, and has a light path formed to converge surfaces of each direction which are observation targets of a subject having a three-dimensional structure into one direction, in which correction of light path length is performed by utilizing difference in refractive index between glass and air to equalize working distance of each surface.

Conventionally, uses of the Chrovit® prism have been in manufacturing industry fields including semiconductor/electronics/electrical machinery, and no attempt has been made to apply it to medicine/biochemistry fields such as cell observation. However, use of such a multiple direction or multi-surface simultaneous observation optical system may allow to perform quick observation and evaluation in all the fields where observation and evaluation of a three-dimensional structure are required, including cell observation.

Accordingly, it is an objective of the invention to eliminate such technical problems and, in consideration of situations of prior art, to provide a multi-surface image acquisition system, observation device, observation method and the like, which can acquire information on an object observed from multiple directions at a time, thereby allowing quick grasping of the structure in observations of an object having a three-dimensional structure, including cell observation.

Solution to Problem

The present invention has been made in view of the above described background, and its object is to make it possible to converge image information, which is obtained when observing an object having a three-dimensional structure from a plurality of different directions, into one direction via an accurate prism, and guide it to one observation device such as a microscope, a digital scanner, and other appropriate observation devices, thereby acquiring information on an object observed in multiple directions at a time, and to quickly grasp the structure. For that purpose, it is basically directed to cause images to be formed on the same focal plane of the observation device, thereby mitigating the occurrence of focus blur, which is caused by the fact that light path length from the object to the observation device differs depending on the observation direction, by utilizing an appropriate prism such as Chrovit® prism singly or in combination of two or more.

However, operation to apply this method to multi-direction observation by use of the Chrovit® prism, and extracting focused images for each observation direction from observed images, and perform stereoscopic reconstruction thereof is complex and time consuming. For example, in a case of: instantly grasping a stereoscopic structure of a moving object; screening a great number of observation targets in as short time as possible; or acquiring optical information in a plurality of fluorescence colors along with bright-field information, image capturing time and data processing time, and data amount will hugely increase, which is therefore not suitable for the purpose.

The inventors of the present invention investigated this problem and, as a result, came to a configuration in which the Chrovit® prism and light field camera technique (Plenoptic camera, all-in-focus camera) are combined; thereby image information at different focal depths of an object viewed from different directions are acquired in a single image capturing operation by using one observation device; and after the image capturing, those information can be freely taken out, thus finding one method to solve the above described problem. Then, based on this, they eventually have completed the present invention. That is, the invention which is to be claimed in the present application as means for solving the above described problems, or which is at least disclosed is as follows.

[1] A multi-surface image acquisition system including: an optical system for simultaneous observation of multi-surfaces (hereinafter, referred to as a "multi-surface observation prism") which is composed of one or more prisms and has a light path formed to converge surfaces in the respective directions of a three-dimensional object, into one direction, in which correction of light path length is performed by utilizing difference between refractive index of glass and of air to equalize working distance for each surface; and a light field camera for expanding the depth of field adjustment range of two or more images being incident to on a the same plane (hereinafter, referred to as an "incident plane") through the multi-surface observation prism.

[2] A multi-surface image acquisition system, comprising: an optical system for simultaneous observation of multi-surfaces (hereinafter, referred to as a "multi-surface observation prism") which is composed of one or more prisms and has a light path formed so as to converge surfaces in the respective directions of a three-dimensional object, which is a target for fluorescence observation, into one direction, wherein light path length correction is made utilizing difference between refractive index of glass and of air to equalize working distance for each surface; and a light field camera for expanding a focal-depth adjustment range of two or more images incident to same plane (hereinafter, referred to as an "incident plane") through the multi-surface observation prism.

[3] The multi-surface image acquisition system according to [1] or [2], wherein the multi-surface observation prism is formed by bonding a necessary number of twice-reflection type prisms that are configured to emit incident light after reflecting the light twice internally.

[4] The multi-surface image acquisition system according to [3], wherein each boundary surface of the bonding (hereinafter, referred to as a "bonding surface") is all polished.

[5] The multi-surface image acquisition system according to any of [1] to [4], wherein a pass-through opening part is formed in the multi-surface observation prism such that the front image of the object, which is on an axis of the object—the multi-surface observation prism—the incident plane, directly enters in the incident plane.

[6] The multi-surface image acquisition system according to [5], wherein the multi-surface observation prism is formed so as to surround a whole or a part of the opening part.

[7] The multi-surface image acquisition system according to any of [1] to [6], wherein the multi-surface image acquisition system is used in combination with any of optical devices listed in (A):
(A): Microscope, scanner, and other appropriate observation devices.

[8] The multi-surface image acquisition system according to any of [1] to [6], wherein the multi-surface image acquisition system includes any of optical devices listed in (A):
(A): Microscope, scanner, and other appropriate observation devices.

[9] The multi-surface image acquisition system according to [7] or [8], wherein the optical device is provided in quantity of one unit (that is, solely).

[10] The multi-surface image acquisition system according to any of [1] to [9], wherein a transparent structure which has no optical effect is provided on an object side of the multi-surface observation prism to isolate the two.

[11] The multi-surface image acquisition system according to [10], wherein the transparent structure is an XY stage.

[12] The multi-surface image acquisition system according to [1] to [11], wherein as a result of the multi-surface observation prism being formed by bonding a necessary number of twice-reflection type prisms which emit incident light after reflecting the light twice internally, five surfaces of an object image are captured.

[13] The multi-surface image acquisition system according to any of [1] to [12], further including
stereoscopic reconstruction means of an image captured via the light field camera.

[14] An observation device using the multi-surface image acquisition system according to any of [1], [2], [3], [4], [5], [6], [7], [9], [10], [11], [12], or [13], wherein at least either one of bright-field observation and fluorescence observation is possible.

[15] The observation device according to [14], wherein a light source for bright-field observation is provided sideward of the multi-surface observation prism.

[16] The observation device according to [14] or [15], including: an excitation light source for fluorescence observation; and a dichroic mirror or other transmission/reflection/spectroscopy means for mediating radiation of excitation light by the excitation light source, or means for limiting a excitation wavelength range or a fluorescence wavelength range (hereinafter, referred to as "dichroic mirror etc."), in which fluorescence light emitted from an object by excitation light radiation is also acquired via the dichroic mirror, etc., and the dichroic mirror etc. is formed to split light paths of the excitation light and the fluorescence light, and such a configuration allows to increase brightness of captured fluorescence image.

[17] An observation method, wherein the observation method is performed by using the observation device according to any of [14] to [16].

[18] The observation method according to [17], wherein the observation method includes a first step of confirming a position of an observation target by bright-field observation at a low magnification, and a second step of confirming occurrence or non-occurrence of fluorescence of an observation target by switching to fluorescence observation while keeping the low magnification.

[19] The observation method according to [18], wherein the observation method further includes a third step of selecting an observation target when occurrence of fluorescence of the observation target is confirmed in the second step, and a fourth step of performing fluorescence observation of the observation target at a high magnification.

[20] The observation method according to [19], wherein the observation method further includes a fifth step of acquiring image by switching to bright-field observation again while keeping the high magnification, after the fourth step.

[21] A screening method, wherein the screening method is performed by using the observation device according to any of [14] to [16].

[22] A stereoscopic reconstruction method of a subject, wherein the stereoscopic reconstruction method is performed by using the multi-surface image acquisition system according to [1] to [13].

Advantageous Effects of Invention

Since the multiple direction or multi-surface image acquisition system, observation device, observation method, screening method and stereoscopic reconstruction method of a subject of the present invention are configured as described above, it is possible, according to this, to acquire image information on an object observed from multiple directions at a time in observations, image acquisition, and structural evaluation of an object having a three-dimensional structure, including cell observation, thereby allowing quick grasping and evaluation of structure in a simple and practical configuration. That is, this is made possible by aggregating image information obtained when observing an object having a three-dimensional structure from a plurality of different directions into one direction via an accurate prism, and guiding it to one observation device such as a proper observation device such as a microscope, digital scanner, and the like.

The present invention is applicable to either of bright-field observation or fluorescence observation. In particular, applying the present invention to fluorescence observation will be a promising method for acquiring three-dimensional information on a targeted object by utilizing transmissivity of fluorescence light. That is, image information which has been corrected by using a prism is introduced to an optical device (observation device) such as a single fluorescence microscope system, or a digital scanner, etc. and image information on an object observed in different directions is represented in an aggregated manner on a single image forming plane, and therefore it is possible to quickly acquire stereoscopic structure information and region-dependent functional information on an object in a single image capturing operation.

In the present invention, while the Chrovit® prism technique, which is dominantly used for inspection of integrated circuits, etc., can be suitably used, this is combined with a single fluorescence observation device etc., and further using a light field camera, allowing multi-surface simultaneous fluorescence observation or multi-direction simultaneous fluorescence observation, etc., and also those information can be freely taken out after the image capturing to provide functions and effects which have never been achieved.

Stereoscopic reconstruction of an object having a three-dimensional structure is also possible from separate images obtained by the multi-surface image acquisition system etc. of the present invention, and various potential application areas are considered. For example, it can be effectively applied to a case in which a multi-well dish (microplate) in which a large amount of cell mass (cell cluster or spheroid, neurosphere or organoid) having a three-dimensional structure is present is screened at a high speed by using fluorescence light to be applied to drug developments etc.; a case in which an object having a complex three-dimensional form for which information acquisition of the structure is insufficient only by observation in one direction is observed by a plurality of fluorescence wavelengths; quick observation of a specimen which is collected by using biopsy forceps etc. and taken out of the living body; or quick evaluation of a region in which a large number of complex and stereoscopic structures are present; and further grasping of structure of an object which shows complex movement with time and an object which three dimensionally changes its shape.

When in an urban area where high-rise buildings having various shapes stand close together, basements of the buildings form one vast floor which is accessible to one another, even if the shape of a targeted building is known, it is difficult to know which is the targeted building by looking up bottom faces of a large number of buildings from the basements. For example, even if the building has a triangular bottom face, it is not possible to tell whether the building has a same triangular shape up to upper floors (that is, has a triangular pillar shape), or has a triangular pyramid shape which is narrowed toward upper floors, unless going up to the upper floors of the actual building. However, it will be far more easy to choose the targeted building out of a large number of buildings if one comes out to the ground level and look up the buildings at an oblique angle (for example 45°). Further, not only looking up in one direction, if one can observe it from four directions, or even from more directions, it will be possible to improve the accuracy of choosing the shape of a targeted building.

However, in general, if one tries to observe an object from many different directions, a plurality of image capturing devices are required, thus causing complication, and upon applying them to expensive fluorescence microscopy, a remarkably expensive and large scaled device will be needed. Actually, although a large scale device by which one object is observed from upward in two directions by obliquely tilting the microscopes has been published, if one tries to do this with a confocal laser microscope which is a standard for the three-dimensional fluorescence observation, the device will become complicated and the cost will significantly increase. Also in the observation of live cells etc., since the cell is in a water solution in a dish, a method of observing the cell from below via glass is typical, and disposing a plurality of observation devices in downward will cause the system to become further large-scaled.

In contrast to this, the present invention is a method which is made easily adaptable for fluorescence observation of an assembly of live cells by guiding image information obtained by observing an object having a three-dimensional structure from different angles via a Chrovit® prism into one observation device. Further, by combining it with a light field camera technique, it is made possible to quickly perform image acquisition in a single focusing operation.

In reality, in a whole body observation of cell clusters and living tissue or a living body having a certain size, image acquisition by fluorescence is widely performed currently. On such actual scene, there are many cases in which: the form of a large number of cell clusters needs to be quickly grasped to determine a targeted object and perform detailed analysis; a large number of cell clusters needs to be screened; the whole structure of a biopsy tissue etc. taking on a complex form needs to be known; and three-dimensional image information etc. of a cell such as macrophage and germs in a moving living body or tissue needs to be grasped easily or quickly.

However, in conventional fluorescence observation, there is no other way but to perform tomographic imaging in which multiple image capturing is performed while changing focal depth in the depth direction, and it will take too much time and effort to perform stereoscopic reconstruction after the three-dimensional observation. Therefore, while there are very serious needs in actual scenes, the present invention can offer a revolutionary solution. Effects of reducing cost, time, and effort are very large and also very practical.

<Each Figure Below Will be Referenced in Examples>

Figure 10:
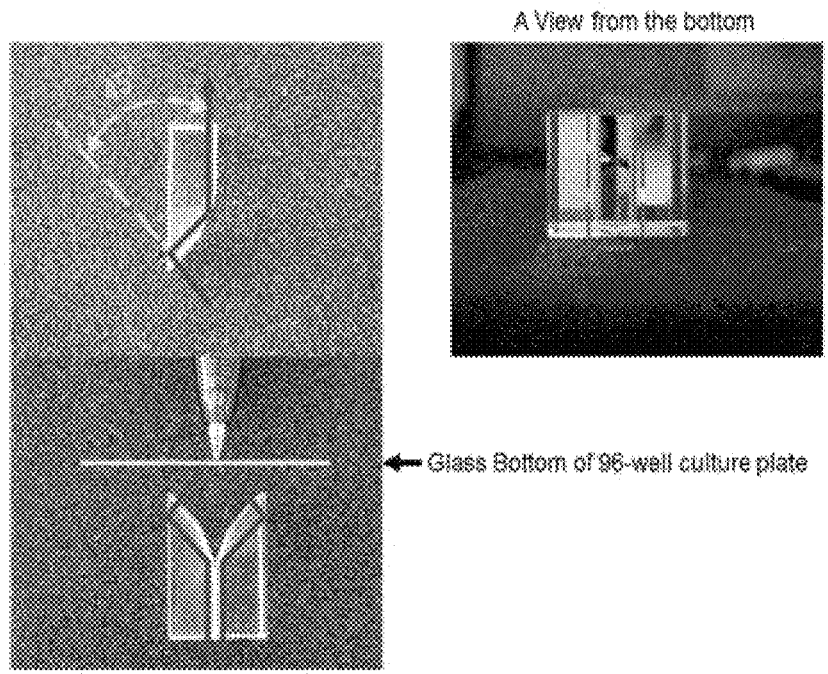

FIG. 10 shows a photograph to illustrate an outline of a 45° twice-reflection type prism which was the base of the initial design.

Figure 11:
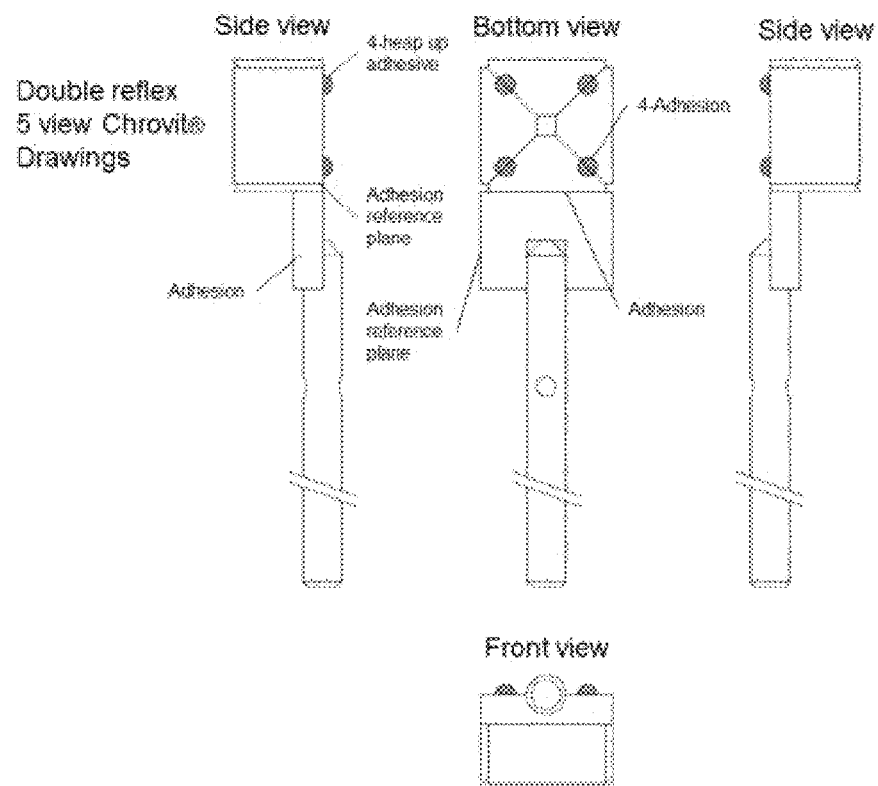

FIG. 11 shows a bottom view, both side views, and a front view from a supporting structure side to illustrate a Chrovit® prism and its supporting structure.

Figure 12:
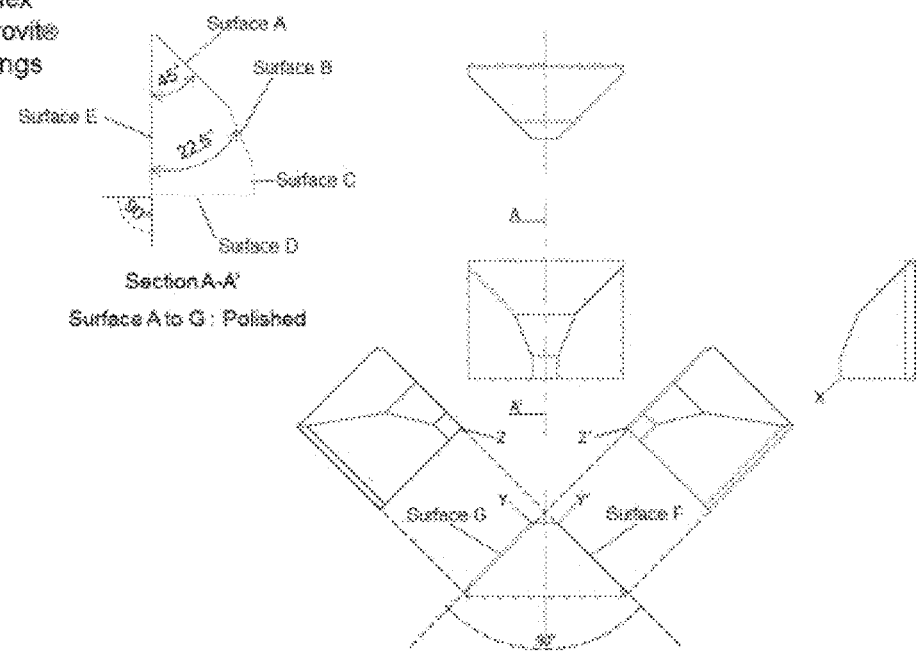

FIG. 12 shows each view (lower) to illustrate the configuration of a completed Chrovit® prism, and a cross sectional view (upper) of the twice-reflection type prism.

Figure 13:
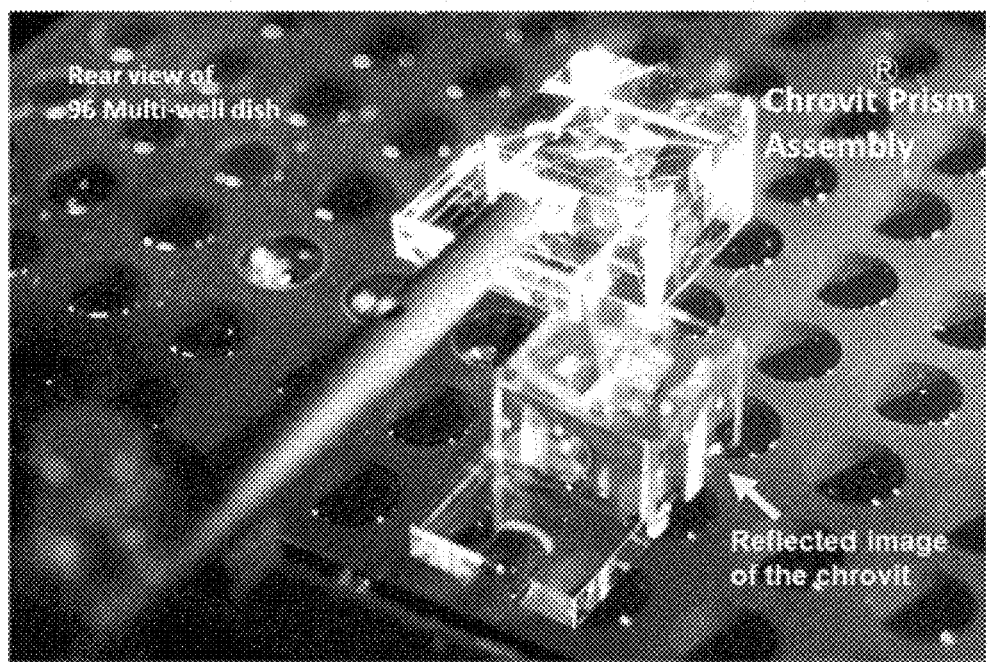

FIG. 13 shows a photograph of the Chrovit® prism.

Figure 14:
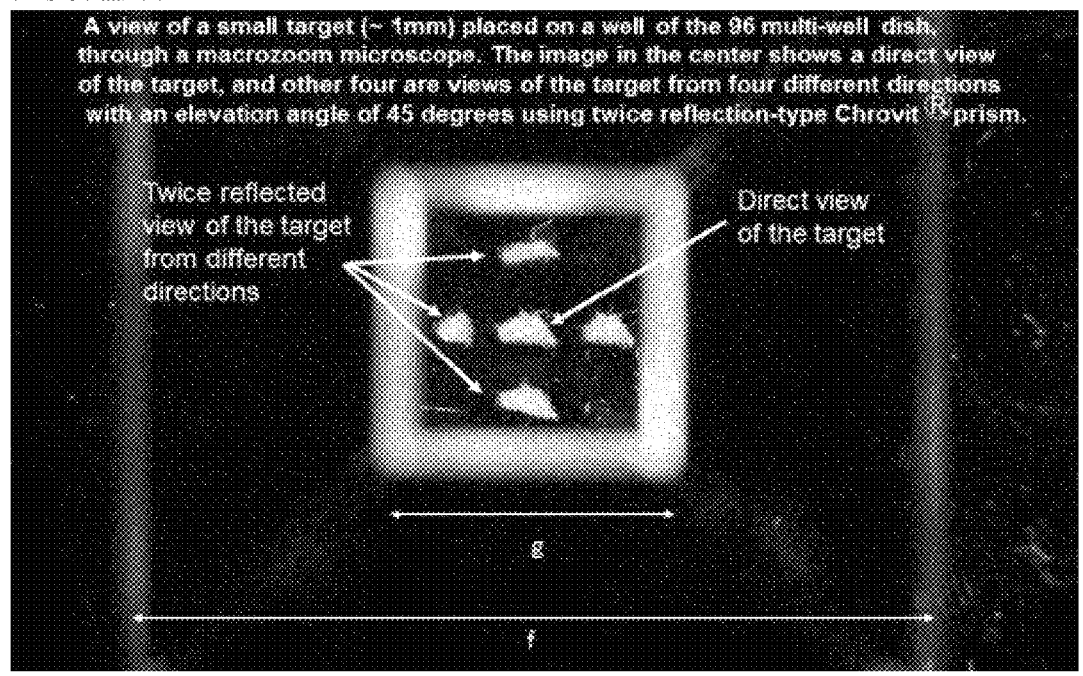

FIG. 14 shows a photograph to illustrate simultaneous multi-surface observation result using the completed Chrovit® prism.

Figure 15:
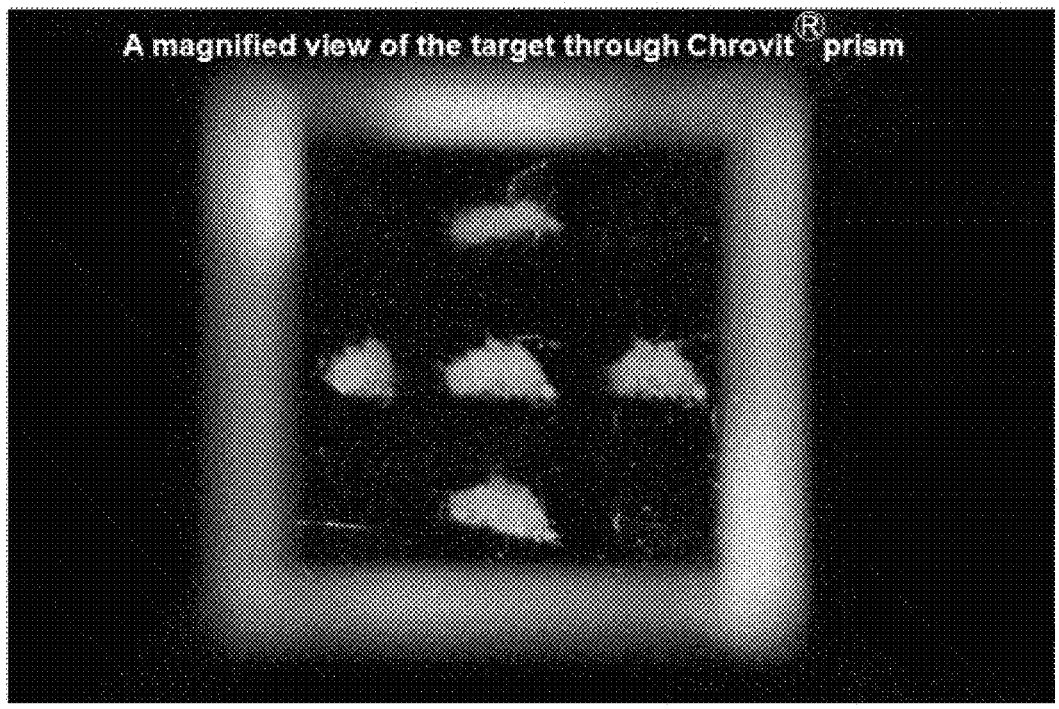

FIG. 15 shows an expanded view of a middle part of FIG. 14.

Figure 16:
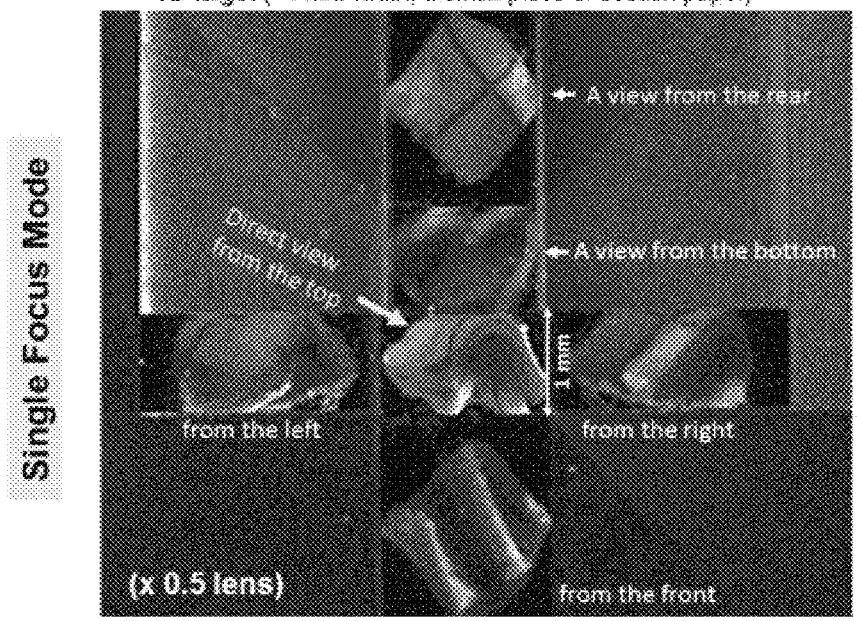

FIG. 16 shows a photograph to illustrate a simultaneous multi-surface observation image of a subject by the Chrovit® prism.

Figure 17:
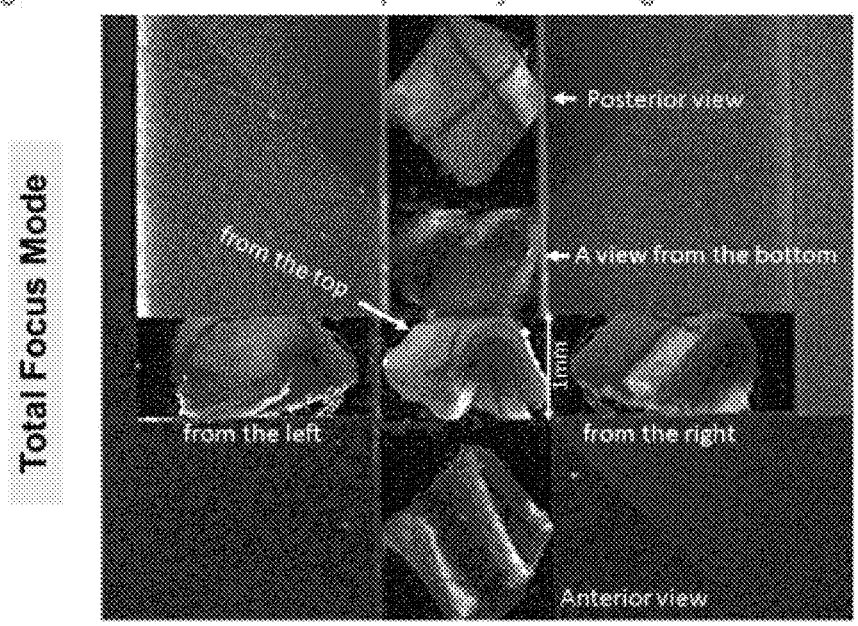

FIG. 17 shows a photograph to illustrate the image of FIG. 16 which is processed by a light field camera.

FIG. 18 shows a photograph to illustrate multi-surface fluorescence observation images of a subject by a multi-surface image acquisition system.

FIG. 19 shows a photograph to illustrate multi-surface fluorescence observation images of another subject by the multi-surface image acquisition system.

Figure 20:
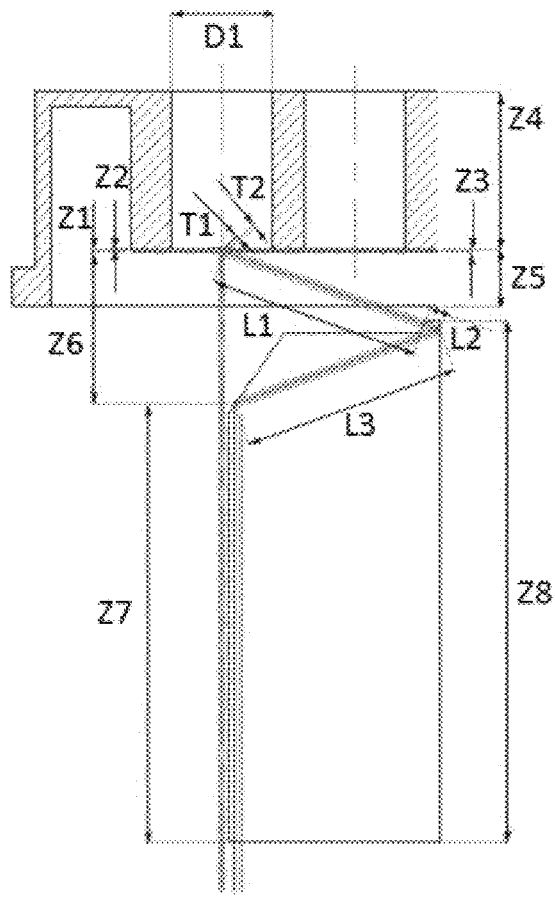

FIG. 20 shows an explanatory diagram to illustrate a design example of the Chrovit® prism when an observation target in a water solution is looked up at an angle of 45° in the water solution during multi-surface fluorescence observation of a subject by a multi-surface image acquisition system.

Figure 21:
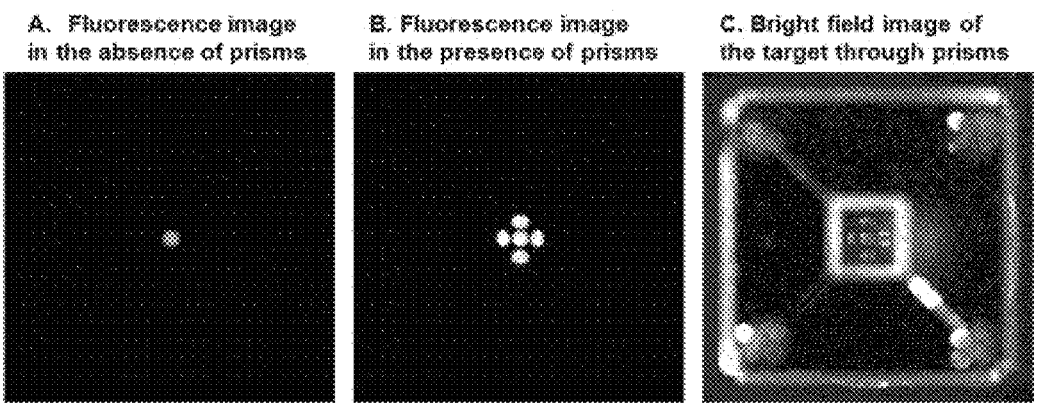

FIG. 21 shows a photograph to illustrate fluorescence intensity enhancement effect by the multi-surface image acquisition system.

REFERENCE SIGNS LIST 1, 31, 41, 51 Observation device
2, 22, 32, 42, 52, 82 Multi-surface simultaneous observation optical system (multi-surface observation prism)
5, 35, 45, 55, 85 Light field camera
10, 310, 410, 510 Multi-surface image acquisition system
49, 59, 89 Stereoscopic reconstruction means
22a Twice-reflection type prism constituting multi-surface observation prism
81 Optical device portion constituting observation device 810
83 Dichroic mirror etc. (transmission/reflection/spectroscopy means)
84 Excitation light source for fluorescence observation
810 Observation device (general configuration) capable of fluorescence observation
C Image of an observation target in water solution projected to Chrovit® prism
D Glass bottom multi-well dish
EL Excitation light
FL Fluorescence
H Pass-through opening part
L Light path of light (fluorescence) emitted directly downward from object
OL Objective lens
S Transparent structure
T Object (observation target)

DESCRIPTION OF EMBODIMENTS

Hereinafter, the present invention will be described in detail according to the drawings.

Figure 1:
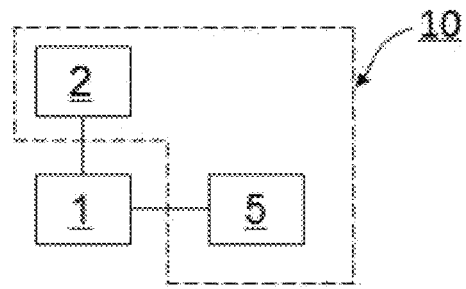
FIG. 1 shows a conceptual diagram to illustrate a basic configuration of the multi-surface image acquisition system of the present invention.

FIG. 1 shows a conceptual diagram to illustrate a basic configuration of the multiple-direction (sometimes entitled multi-surface) image acquisition system of the present invention. As illustrated, the multi-surface image acquisition system 10 in its most basic configuration includes: a multi-surface simultaneous observation optical system (multi-surface observation prism) 2, which is composed of one or more prisms, having an object side and an observation side and which has a light path formed to converge surfaces in the respective directions of a three-dimensional object into one direction, and in which light path length correction is performed by utilizing difference between refractive index of glass and of air to equalize working distance for each surface; and a light field camera 5 for expanding a focal-depth adjustment range of two or more images formed in the same plane (image forming plane) via the multi-surface observation prism 2. Note that the multi-surface observation prism 2 is provided between the subject and the observation device 1, and the light field camera 5 is connected to the observation device 1.

Note that in this figure, although a portion excluding the observation device 1 is referred to as a multi-surface image acquisition system 10, this means that the concerned system 10 includes the multi-surface observation prism 2 and the light field camera 5 as essential components, and the multi-surface image acquisition system of the present invention may be configured to include an observation device as described later.

Owing to such a configuration, in the multi-surface image acquisition system 10, surfaces in the respective directions of a three-dimensional object are converged into one direction by the multi-surface observation prism 2 composed of one or more prisms, and the working distance for each surface is equalized so that images of each surface are formed in the same plane (image forming plane) of the observation device 1 with focus blur being mitigated. Then, two or more images formed are captured by the light field camera 5 in a single image capturing operation, as images whose focal-depth adjustment range is expanded and which are better focused. Further, after the image capturing, the image information can be taken out freely and subjected to stereoscopic reconstruction processing.

It is noted that herein light field camera technique by use of a light field camera refers to a technique for enabling simultaneous acquisition of image information at various focal depths (all-in-focus image) and software-based stereoscopic reconstruction without changing the focus of the main lens by arranging multiple micro lens arrays having different focal points and viewpoints in front of the image sensor of the camera between the main lens (front lens) and image plane (image sensor) while it is generally necessary to separately capture images of different focal depths by changing the focus of the main lens in the observation of an object having a three-dimensional structure.

Conventionally, algorithm in the light field camera was to acquire images of "surface" structure, which is viewable from the front, of an object having a three-dimensional structure, or an object having a depth in a single image capturing operation persistently in a bright-field, and after the event, to make them stereoscopically reconstructable. This is because, in the bright-field observation, the interior of the subject is hardly visible unless it is a transparent target. Therefore, although there was significant difficulty in the idea of simultaneously acquire images of the three-dimensional structure by using the light field camera not only from one direction at this side, but also from multiple directions (surfaces), thereby subjecting them to stereoscopic reconstruction, what allowed realization of the idea in the present invention was cooperation with the multi-surface simultaneous observation optical system (multi-surface observation prism). Such a configuration was first presented in the present invention. Especially with regard to fluorescence observation, neither example of observation of fluorescence images from multiple directions acquired through the Chrovit® prism by a fluorescence microscope, nor example of observation thereof by use of the light field camera have been found.

However, the fact that images from a plurality of surfaces of a subject having a three-dimensional structure are acquired in the system of the present invention means that light from a plurality of various directions comes into the light field camera. It is surely conceivable that these lights interfere with each other on the light field camera, and any desired image or useful image cannot be obtained at all. However, in the present invention, by combining the Chrovit® prism and the light field camera, it is made possible to obtain very clear images as described later either in bright field observation or in fluorescence observation.

Figure 2:
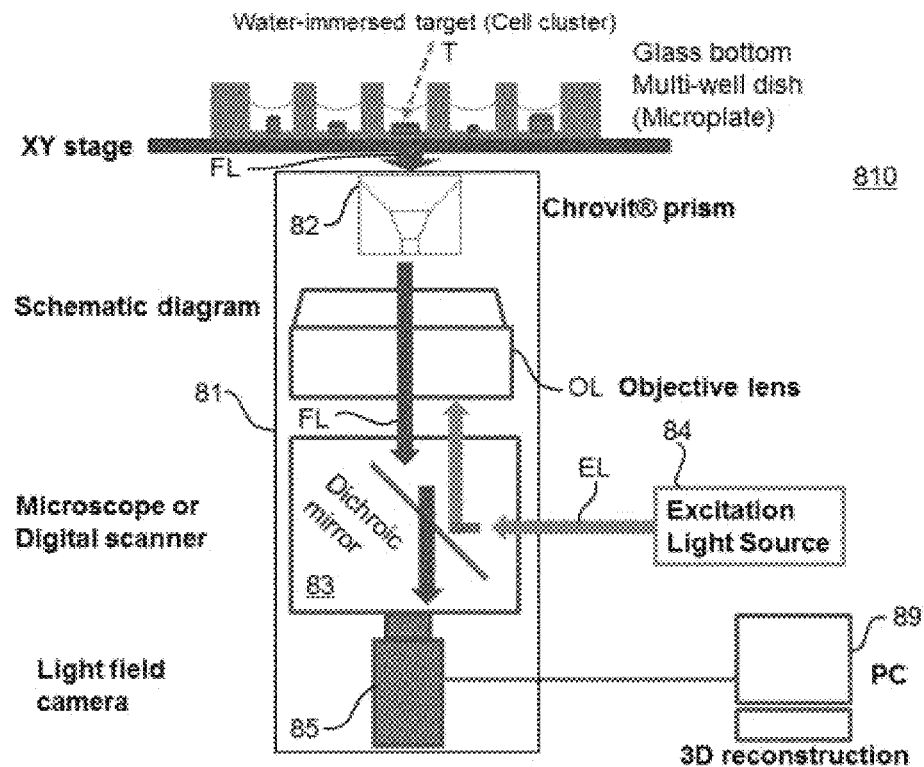
FIG. 2 shows an explanatory diagram to conceptually illustrate a configuration example of the multi-surface image acquisition system of the present invention (a multi-surface fluorescence observation device of a subject having a three-dimensional structure) which is capable of fluorescence observation.

FIG. 2 shows an explanatory diagram to conceptually illustrate a configuration example of the multi-surface image acquisition system (multi-surface fluorescence observation device of a subject having a three-dimensional structure) of the present invention. In the present configuration example, although this is a system example in which cell clusters on a multi-well dish (micro-plate) placed on an XY stage are observed by an observation device 11, it goes without saying that the present invention will not be limited to the illustrated example. For example, an observation device 81 may be a microscope or scanner.

The digital scanner herein corresponds to an electrically driven microscope in which a camera in place of an ocular is used for observation, and it can be realized by moving "the detection device portion (81) including the Chrovit® prism, objective lens, dichroic mirror, and camera" shown in FIG. 2 in an XY direction or further in a Z direction. An excitation light source may be moved integral with the detection device portion (81), or it can also be fixed by being connected with the detection device portion (81) with an optical fiber, etc.

Also, it can be realized by a general method of moving an XY stage carrying a specimen in an XY direction or Z direction with the detection device portion (81) being fixed. For movement in the Z direction, any of schemes in which the detection device portion (81) alone is moved, the stage alone is moved, or the both are moved together can be used.

FIG. 2 shows an explanatory diagram to conceptually illustrate a configuration example of the observation device of the present invention which is capable of fluorescence observation. As illustrated, the observation device 810 of the this example is provided with an excitation light source 84 for fluorescence observation and a dichroic mirror etc. 83 for relaying radiation of excitation light EL by the excitation light source 84, in which fluorescence light FL emitted from the object T by radiation of excitation light EL is also acquired via the dichroic mirror etc. 83, and the dichroic mirror etc. 83 is formed to split the light paths of the excitation light EL and the fluorescence light FL, and it is characteristic feature of this example to be able to increase the brightness of the captured fluorescence image by such a configuration.

Note that as the multi-surface observation prism 82 according to the present invention, the above described Chrovit® prism can be suitably used; however, without being limited thereto, any prism, or any prism assembly combining appropriate prisms, or any other prism function can be used as the multi-surface observation prism of the present invention provided that it can cause images to be formed on the same focal plane of the observation device, thereby mitigating focus blur by using prisms of predetermined specification singly or in combination of two or more.

As illustrated, the multi-surface image acquisition system 810 in its basic configuration includes: a multi-surface simultaneous observation optical system (multi-surface observation prism) 82 which is composed of one or more prisms and has a light path formed to converge surfaces in the respective directions of a three-dimensional object, which is an observation target, into one direction, and in which light path length correction is performed by utilizing difference between refractive index of glass and of air to equalize working distance of for each surface; and a light field camera 85 for expanding a focal-depth adjustment range of two or more images formed in the same plane (image forming plane) via the multi-surface observation prism 82. Note that the multi-surface observation prism 82 is provided between the subject and the observation device 81, and the light field camera 85 is connected to the observation device 81. Further, it can also be configured to include stereoscopic reconstruction means 89 of images acquired via the light field camera 85. Moreover, although the fluorescence excitation light source 84 may integrated into 81, it may be placed outside of 81, and incident light may be guided to the dichroic mirror 83 by using an appropriate method such as an optical fiber.

Owing to such a configuration, in the multi-surface image acquisition system 810, surfaces in the respective directions of a three-dimensional object, which is an observation target, are converged into one direction by the multi-surface observation prism 82 composed of one or more prisms, and the working distance of each surface is equalized resulting in that images of each surface are formed on a plane (image forming plane) with the objective lens within the observation device 81 with focus blur being mitigated. Then, the formed two or more images are acquired by the light field camera 85 in a single image capturing operation, as images whose focal-depth adjustment range is expanded and which are better focused. Further, images after the image capturing are saved in stereoscopic reconstruction means 89 such as a personal computer and, after the event, can be taken out freely and subjected to stereoscopic reconstruction processing.

Owing to such a configuration, in the observation device (general configuration) 810, the excitation light EL emitted from the excitation light source 84 is radiated to a subject T through a multi-surface observation prism 82 via a dichroic mirror etc. 83, fluorescence light FL emitted from the object T by excitation light EL radiation enters into the dichroic mirror etc. 83 through the multi-surface observation prism 82, and fluorescence light FL is acquired by the optical device 81 by taking a light path different from that of the excitation light EL with the dichroic mirror etc. 83. Such effect allows to increase brightness of fluorescence image to be acquired. This point will be described in more detail.

Generally, in fluorescence observation, excitation light EL having a certain wavelength and emitted from the fluorescence light source 84 is radiated toward the subject (object) T through an objective lens. Before entering the objective lens, the excitation light EL is reflected, for example, at 45° as illustrated by the dichroic mirror etc. 83, to excite fluorescent substance within the subject T. Then, the fluorescent substance emits fluorescence light FL which is light having a longer wavelength than that of the radiation light EL in every quarter directions, and only part of the fluorescence light FL in one direction which returns to the objective lens is collected. Since the fluorescence light FL has a longer wavelength than that of the radiation light as a result of being deprived of optical energy at the subject T, it can be guided to pass through the dichroic mirror etc. 83 without being reflected by appropriately designing the dichroic mirror etc. 83. Thus, the dichroic mirror etc. 83 serves to split light paths of the incident light (excitation light) and the fluorescence light.

According to such configuration, in the observation device 810 and the multi-surface image acquisition system of the present invention, it is possible to obtain very bright fluorescence observation image compared with a case of conventional fluorescence observation (refer to FIG. 21 shown below). That is considered to be affected by the fact that since the excitation light EL not only irradiates the subject T directly through the opening, but also radiates from four directions at an elevation angle of 45° like a spot light, five times as much as light radiation becomes possible in simple calculation even when the same fluorescence light source 84 is used.

Conventionally, a problem existed in fluorescence measurement in that an image obtained is very dark. However, in recent years, by supplementing that by an ultra-high sensitivity camera like an sCMOS, or using an LED light source which is a very bright light source, it has become possible to cope with the problem of darkness of acquired image, and usage of fluorescence method has become greatly expanded. Thus, improvement of brightness by the present invention can be further promoted.

That is, according to the present invention, since it is considered that five times as much as intensity in simple calculation can be obtained even when the same light source is used, very bright images are obtained, and they can be detected without using an amplification method which produces much noise, such as digital gain of the detector. Therefore, imaging at a space resolution inherent to the detection device itself is possible, and this will as a matter of course contribute to improvement in space resolution, making it possible to obtain a clear fluorescence image which is beyond conventional common sense.

Further, in the multi-surface observation prism used in the device 810 of this example, since radiation is performed from below in such a way to partly or wholly surround the subject T, uniform radiation with little irregularities becomes possible. In the case of the Chrovit® prism, it is also possible to observe the subject in further more directions by increasing the number of prisms, such as like a six-surface configuration instead of the four-surface configuration which has been mainly taken up in the present description.

In the present invention, in addition to such amplification of excitation light EL, amplification of fluorescence light FL is also performed. That is, in the case of fluorescence observation, while fluorescence light FL is emitted in "every quarter" directions from a fluorescent substance of the subject T, by using a multi-surface observation prism (Chrovit® prism) such as a twice-reflection type etc., it is possible to wholly capture fluorescence light emitted in directions of four twice-reflection type prisms constituting the multi-surface observation prism, and fluorescence light emitted in a direction of the pass-through opening part (H), that is, fluorescence light in total of five directions including fluorescence light which has not been utilized in the past.

When stereoscopic observation is performed by a conventional fluorescence microscope, it is necessary to perform measurement while shifting the focal depth, and fluorescence fading is caused until a fluorescence image of a necessary portion is obtained, and image capturing takes long hours; however, according to the method of the present invention, since fluorescence signals from five directions can be obtained in a single image capturing operation at a maximum efficiency without a possibility of fading and repeating the image capturing, it is possible to obtain a stereoscopic fluorescence image with excellent image quality. Further, as described below, this feature will be maximized by using the light field camera in combination. This is very large effect in secondary effects obtained by the present invention.

For example, in a case of ordinary microscopy, only fluorescence signal incident only in a direction of pass-through opening is acquired one by one by tomography image capturing. Upon further capturing images looked up at an oblique angle of 45° by using an ordinary microscope, while tomography image capturing in that direction becomes necessary, at that time (since tomography image capturing is already performed once in the direction of pass-through opening and thereby fluorescence fading has occurred), tomographic imaging of an object which has become substantially dark will be performed, and upon further capturing images from different 45° direction, the image will become darker, repeating the same.

In contrast to this, according to the method of the present invention, since excitation light is radiated from five directions at a time, and fluorescence signals radiated in five directions from the subject are acquired in one image capturing operation from five directions, unlike at the time of ordinary microscopy, there is no worry about fluorescence fading due to imaging order, image capturing from any direction can be performed at substantially same condition, and it is possible, in any direction, to acquire brighter image than at the time of ordinary microscopy by using the same light source (see FIG. 21 shown below).

Note that in FIG. 2, although the dichroic mirror etc. 83 is configured to reflect excitation light EL and transmit fluorescence light FL, the present invention will not exclude a case in which these effects are reversed by the design of the dichroic mirror. Moreover, in the figure, although the dichroic mirror etc. 83 is shown as a dichroic mirror like a filter cube, this is merely an example in this figure which is merely a conceptual explanatory diagram, and in place of the dichroic mirror, alternative means such as a liquid crystal tunable filter and an acoustic tunable beam splitter etc. may be used. In short, it may be so-called transmission/reflection/spectroscopy means which limits an excitation wavelength range or a fluorescence wavelength range and allows transmission or reflection of light depending on the wavelength thereof. Note that a tunable filter is a device that limits the pass wavelength width of fluorescence wavelength within a certain range without using a mirror.

The multi-surface image acquisition system 810 of the present invention may be used for fluorescence observation to provide a promising method for acquiring three-dimensional information on a targeted object by utilizing transmissivity of fluorescence light. While the multi-surface image acquisition system 810 of the present invention is useful not only in fluorescence observation but also in bright-field observation, there may be a case that sufficient information is not obtained when a structure is in the near side of the targeted object. In such a case, a conceivable method is to search an angle, at which the targeted object is viewable, by rotating the object or the prism as needed.

However, the light path length, in which light information such as reflection of light having hit the object, or fluorescence or phosphorescence emitted from the object starts from the object and arrives at an observation device through a prism from different directions, is not uniform depending on the position and structure of a object, and an optical device, etc. present on a light path from the object to the observation device. Therefore, upon attempting to simultaneously acquire image information on an object observed from different directions by one observation device, even if focusing of the observation device is done so as to be optimal to an image obtained from one observation direction, a phenomenon may occur that observation from a different direction is not in focus since the light path length is different. This is more evident in fluorescence observation, causing a serious problem that fluorescence of an object is not visible.

Accordingly, the system of the present invention is directed to mitigate the occurrence of focus blur which is caused by the fact that light path length from the object to the observation device differs depending on the observation direction, by using an appropriate prism such as Chrovit® prism, in which light path length is corrected by utilizing difference in refractive index between glass of prism and air, singly or in combination of two or more, thereby causing images to be formed in the same focal plane of the observation device. The image information corrected by using a prism is introduced into a single fluorescence microscope system or an optical device such as a digital scanner, and image information on an object observed from different directions is represented in an aggregate manner on a single image forming plane so that stereoscopic structure information on the object and region-dependent functional information are acquired in a single image capturing operation as described above.

However, even when an object is observed only from one direction, a phenomenon occurs that when a specific region of the object is accurately brought into focus, another observation region of the object becomes defocused (when the point is beyond the depth of field of the lens). This phenomenon becomes more remarkable as a lens of higher magnification is used. Further, since generally observation region in which an object can be located has a certain area, if the object is present at a position different from an expected position in the design of the Chrovit® prism, and it is present at a position beyond the depth of field of the lens, the object becomes defocused.

In such a case, generally, an approach of reconstructing a stereoscopic image after capturing a number of photographs with the focus being shifted in the depth direction (tomographic imaging) is taken. However, operation of applying this approach to multi-direction observation using the Chrovit® prism, and extracting images which each is focused in each observation direction to make stereoscopic reconstruction is complicated and time-consuming, and therefore when for example attempting to instantly grasp a stereoscopic structure of a moving object, when screening a huge number of observation targets in as short time as possible, or when acquiring optical information in plural fluorescence colors along with bright-field information or separately, the image capturing time, data processing time, and the amount of data significantly increase, and therefore the approach is not suitable. This is because the light field camera is introduced in the system of the present invention.

Figure 3:
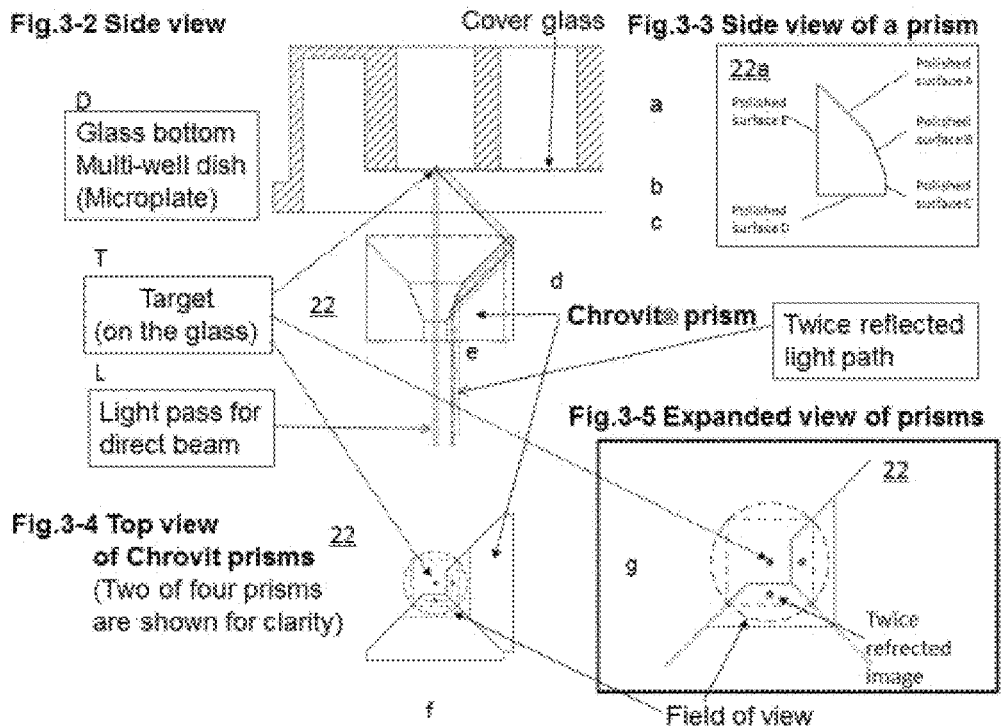
FIG. 3 shows an explanatory diagram to show an example of the multi-surface image acquisition system of the present invention using a twice-reflection type prism with reference to FIGS. 3-2 to 3-5 shown in the figure.
Figure 4:
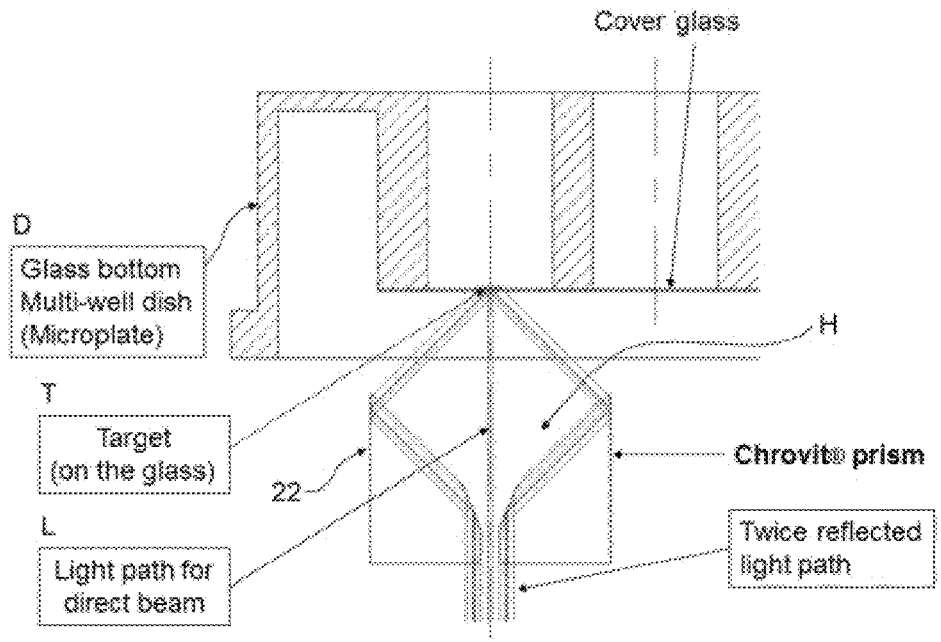
FIG. 4 shows a side view of a principal part of an example of the multi-surface image acquisition system of the present invention using the twice-reflection type prism.
Figure 5:
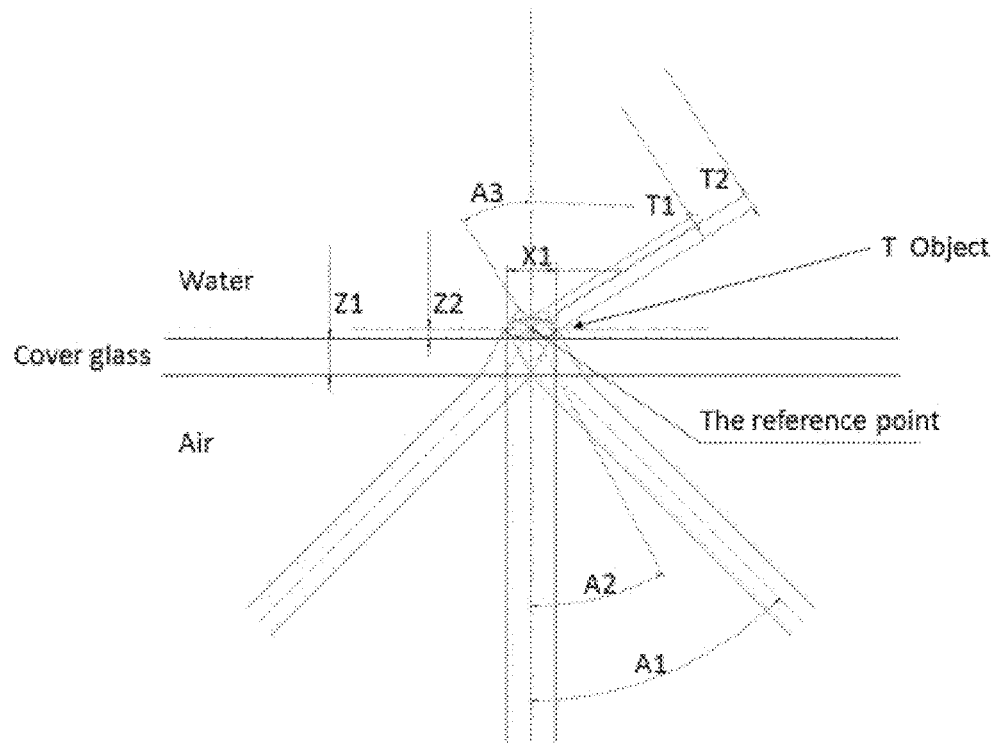
FIG. 5 shows an expanded view of a light path near an observation target when the observation target is in a water solution on a cover glass in FIG. 4.

FIG. 3 shows an explanatory diagram to illustrate, with reference to FIGS. 3-2 to 3-5, an example of a multi-surface image acquisition system of the present invention using a twice-reflection type prism. FIG. 3-2 shows a side view of a principal part of an example of the multi-surface image acquisition system of the present invention using a twice-reflection type prism. Moreover, FIG. 3-3 shows a cross-sectional view of a prism constituting a multi-surface observation prism according to the example shown in FIG. 3-2; FIG. 3-4 shows a partial plan view (top view) of the multi-surface observation prism according to the example shown in FIG. 3-2; and FIG. 3-5 shows an expanded view of a middle part in FIG. 3-4. As shown by these figures, the multi-surface image acquisition system of this example is mainly configured such that the multi-surface observation prism 22 is formed by bonding a necessary number of twice-reflection type prisms 22a which internally reflects incident light twice and emits the same. FIG. 3-5 also shows an image formed by a light flux emitted from the object T being reflected twice in the prism and entering into an observation device. In the figure, this is the image indicated as "Twice-reflected image". A dotted circle in the middle part is an expected object center.

Figure 6:
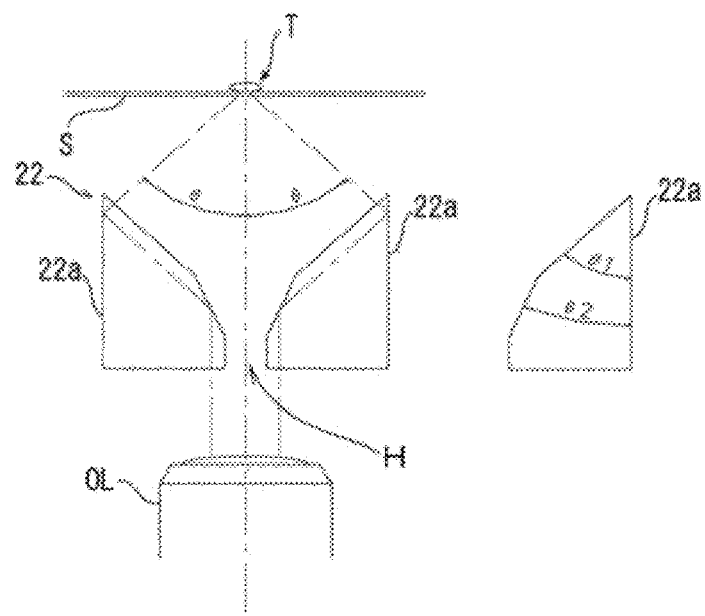
FIG. 6 shows a cross sectional view to illustrate side arrangement of the multi-surface observation prism according to the example shown in FIG. 3.

As illustrated in FIGS. 4, 6, etc., the multi-surface image acquisition system of the present invention may be configured as that the multi-surface observation prism 22 is formed with a pass-through opening part H such that a front image of the object T on an axis of "subject T—multi-surface observation prism 22—image forming plane" is directly focused in the image forming plane. Moreover, as illustrated, the multi-surface observation prism 22 may be configured to surround a whole or a part of the opening part H. Although this example is configured such that four of the twice-reflection type prism 22a having a structure shown by FIG. 3-3 in FIG. 3 are used to form a hollow structure, the hollow part providing the opening part H, it is may be configured such that two or three of the same prisms 22a are used to form an opening part which is partly opened to sideward, that is, only a part of the opening part H is surrounded.

In this illustrated example, four of the twice-reflection type prisms 22a are bonded to constitute the multi-surface observation prism (multi-surface simultaneous observation optical system) 22, and thereby in this example system, images may be acquired from a total of five directions including four directions (front, rear, left and right) on the plane orthogonal to the optical axis of the subject T and one direction directly through the pass-through opening part H. That is, images of the object T can be acquired from five different surfaces.

This example system will be described in more detail with reference to FIG. 6.

In this example system, out of fluorescence light emitted from a subject T on a multi-well dish D, light which enters a twice-reflection type prism (22a) constituting the Chrovit® prism 22 disposed in the lower surface of a dish, and enters into a mirror surface at an angle of θ1=45° to be reflected once, thereafter internally reflected again in the prism (22a) at an angle of θ2=22.5° to exit directly downward direction, is further collected to an objective lens (OL) placed further below the prism to be detected. Moreover, fluorescence light L which is emitted directly downward from the subject T will enter straight into the observation device below through the opening part H of the middle part of the Chrovit® prism 22. Although the light path length is different between them, the light path length is corrected by utilizing the difference between refractive index of glass of the prism and of air.

Note that the twice-reflection type prism according to the present invention will not be limited to a configuration of "45° initial reflection–22.5° second reflection" like this example. For example, it can be appropriately configured with the initial reflection angle being in a range of 0 to 60°.

Moreover, when the multi-surface observation prism (multi-surface simultaneous observation optical system) is composed of two or more prisms, while it can be composed by using those with the same structure like the prism 22a of this example, without being limited to this, use of prisms with different structures to make a multi-surface observation prism (multi-surface simultaneous observation optical system) will not be excluded. Further, the number of reflection in the prism is not limited to twice, any configuration will not be excluded provided that a light path which eventually allows to acquire all desired images in the same direction can be formed. Note that hereinafter in the present description, an example of use of a twice-reflection type prism having a configuration of 45° initial reflection–22.5° second reflection will be mainly described.

As shown by FIG. 3-3 in FIG. 3, each prism 22a constituting the multi-surface observation prism 22 according to the present invention may be configured such that boundary surfaces (bonding surfaces) of mutual bonding of prisms 22a are all polished. The twice-reflection type prism 22a according to this example has a configuration in which side-surface shape is formed of five surfaces, and all of the surfaces are polished surfaces, that is, polished surfaces A, B, C, D, and E which are subjected to polishing to achieve the effects of the present invention more perfectly.

While polished surfaces A and D are transmission surfaces, and polished surfaces E and B are reflection surfaces, although the polished surface C does not relate to neither reflection nor transmission as seen from FIGS. 4 and 6, it is important to configure such that all the surfaces including the polished surface C are polished in this way and such prisms 22a are mutually bonded. Note that although it is important that the prisms 22a themselves to be bonded are polished, it is also important that the bonding structure itself had no optical effects. This point will be described in more detail in Examples.

FIG. 5 shows an expanded view of a light path near an observation target when the observation target is in a water solution on a cover glass in FIG. 4. The figure shows the light path near an observation target for which the refractive index of the medium such as air, cover glass or water solution are factored in.

Moreover, although the transparent structure S shown in FIG. 6 is a transparent structure which is provided on the subject T side of the multi-surface observation prism 22, and has no optical effects, and isolates both of the multi-surface observation prism 22 and the subject T, the multi-surface image acquisition system of the present invention may include this transparent structure S. As the transparent structure S, for example, glass and transparent resin (for example, acrylic resin) having no optical effect may be appropriately used, and for example, an XY stage is conceivable, in this case, the multi-surface image acquisition system of the present invention is configured to include the XY stage as its component. Of course, a configuration without it may be regarded as the multi-surface image acquisition system of the present invention, and it may be regarded as that the XY stage etc. and the present system are used in combination.

According to the multi-surface image acquisition system configured to have such a transparent structure, or configured to be used with a transparent structure in combination, it is possible to acquire images of each surface of the subject T without direct contact with the subject T which is present on the opposite side of the transparent structure S. This feature can be one of very effective methods when a microscope, a digital scanner, or another appropriate observation device is used in combination with the multi-surface image acquisition system; or when the multi-surface image acquisition system is configured to include these observation devices, for example, when this system is applied to, for example, high speed screening of a multi-well dish (microplate) in which there are a large amount of three-dimensionally accumulated cell clusters. Note that a screening method performed by using the multi-surface image acquisition system of the present invention, including the high-speed screening described herein, is in itself within the scope of the present invention.

Figure 7:
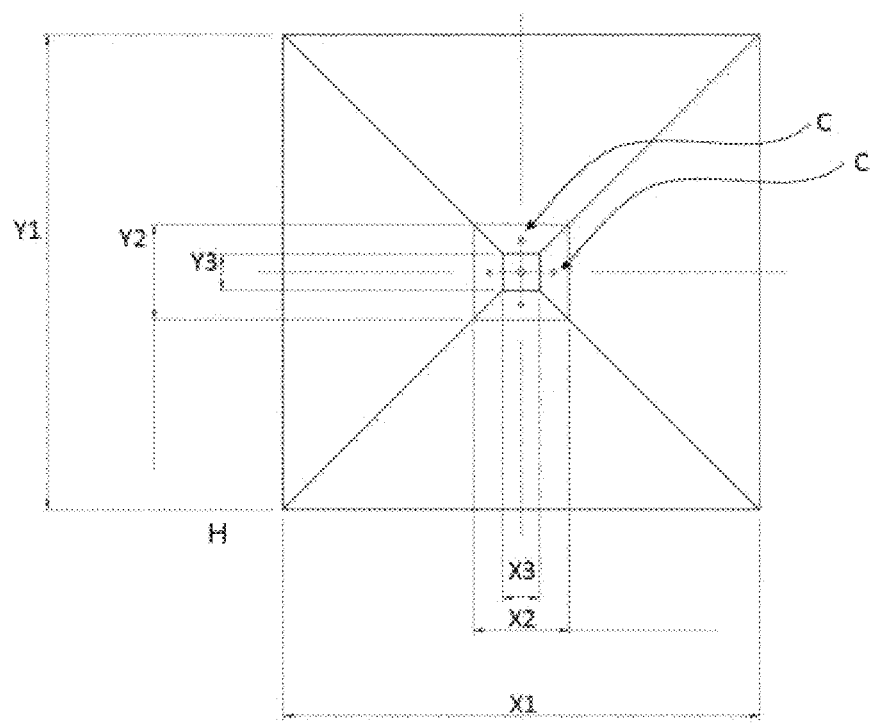
FIG. 7 shows a plan view (top view) of the multi-surface observation prism according to the example shown in FIG. 3.

Moreover, FIG. 7 shows a planar structure of the multi-surface observation prism 22 according to the present example system. Herein, four of twice-reflection type prisms (Chrovit® prism) are shown. In the figure, circular images (in total of 4 places) indicated by symbol C are images formed by observation targets in a water solution being projected to the Chrovit® prism. Note that any of FIGS. 4 to 7 is a figure in which an observation target is present in a water solution. For example, in the case of FIG. 5, although A1 is 45°, that is, the elevation angle at which the Chrovit® prism looks up the object is 45°, and the elevation angle A2 at which the prism looks up the object in the water solution is 32°.

As shown in the above described FIG. 1, the multi-surface image acquisition system 10 of the present invention may be configured to be used in combination with an observation device 1. For example, it includes combined uses with a microscope, a scanner, an image sensor, or an optical device other than the aforementioned three. Although use of a plurality of, or plural kinds of, optical devices will not be actively excluded from the present invention, it can be said that a configuration for making the best of the features of the present invention, that is, simplicity and high practicality, is a configuration in which the optical device is used in one unit, that is, singly.

Figure 8:
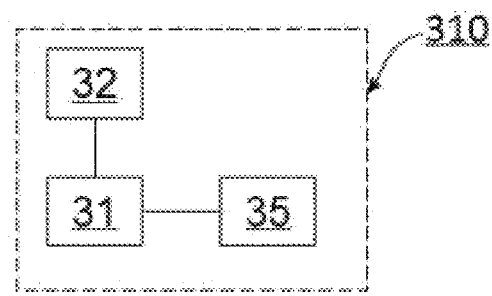
FIG. 8 shows a conceptual diagram to illustrate another basic configuration of the multi-surface image acquisition system of the present invention.

FIG. 8 shows a conceptual diagram to illustrate another basic configuration of the multi-surface image acquisition system of the present invention. As illustrated, a multi-surface image acquisition system 310 may include an observation device 31 in its configuration. As the observation device 31, for example, a microscope, a scanner, an image sensor, or an optical device other than the aforementioned three can be used. Although use of a plurality of, or plural kinds of optical devices will not be actively excluded from the present invention, it can be said that a configuration for making the best of the features of the present invention, that is, simplicity and high practicality, is a configuration in which the optical device is used in one unit, that is, singly.

Figure 9:
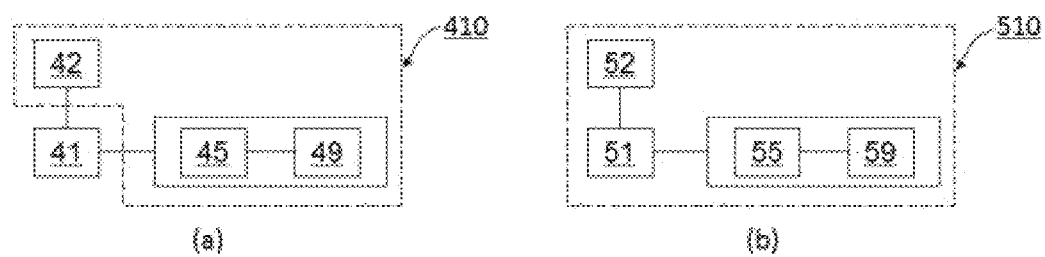
FIG. 9 shows a conceptual diagram to illustrate a configuration of the multi-surface image acquisition system of the present invention including stereoscopic reconstruction means of image.

FIG. 9 shows a conceptual diagram to illustrate a configuration of the multi-surface image acquisition system of the present invention including stereoscopic reconstruction means of image. As described above, a multi-surface image acquisition system 410 of the present invention is configured to include stereoscopic reconstruction means 49 of images acquired via a light field camera 45, etc. Note that (a) in the figure shows a configuration in which the system 410 is used in combination with an observation device 41, (b) shows a configuration in which a system 510 includes an observation device 51.

An observation device which uses any of the multi-surface image acquisition systems described so far, and which enables either bright-field observation or fluorescence observation also falls within the scope of the present invention. In the case of configuration with a bright-field observation function, a light source for bright-field observation may be provided sideward of the multi-surface observation prism. In uses which are mainly supposed in the present invention, the space in which in particular the multi-surface observation prism of the multi-surface image acquisition system is disposed is limited. Such disposition is suitably used as a configuration which allows the light source for bright-field observation to function, and to be disposed without difficulty.

Taking a microscope for cell observation as an example, an observation device capable of bright-field observation will be further described (see FIG. 2 described above).

In general, a multi-well dish for use in fluorescence measurement has a side face made of plastic, whose color is black or white, and especially for those capable of fluorescence measurement, the side face has a black color to prevent diffuse reflection of light. That is, since the wall portion of the multi-well dish is not transparent, illumination from sideward is difficult. Therefore, either illuminating from top (Top Read) or illuminating from bottom (Bottom Read) is given consideration.

However, since illumination from top cannot illuminate the underside surface of a three-dimensional target which is located in a deep part below (back side when viewed from above), for example, a spherical object (subject), it is not preferable in a case in which the microscope is inverted type, and the lens makes approach from under side. Then, a necessary consequence is illumination from below. However, since a Chrovit® prism needs to be disposed between an objective lens and an object, with the prism looking up from below the object through a glass bottom of the multi-well dish and the object being located on the same, there is hardly any space for containing the illumination light source.

Then, to obtain a sufficient bright-field image, four optical fiber light sources are placed in fore and aft, and left and right directions of the Chrovit® prism, and it is arranged to illuminate the object from below. However, in the Chrovit® prism based on twice-reflection type prism which is initially used, all surfaces other than that relating to a direct light path of light from the object are of frosted glass specification, and it was not possible to perform uniform illumination. After all, as a result of performing whole surface polishing of the prism as described above, there is no diffusion of illumination light, thereby establishing an illumination method in the bright-field observation.

While the above described point will also be referred to in Examples to be described below, further, in bonding surfaces produced by four surface bonding of the prism, a bonding method to prevent diffuse reflection of illumination light becomes important. In any way, a contrivance for holding the multi-surface observation prism allows to realize a configuration in which sufficient radiation can be performed without obstruction of visual field in bright-field observation.

The observation method which is performed by using any of the above described observation devices of the present invention will also fall into the scope of the present invention. For example, in fluorescence image acquisition, it is often the case that an object which is supposed to be the observation target does not emit fluorescence, and that only a part of the observation target emits fluorescence. Such cases, too numerous to count, include, for example, a case in life science field in which a specimen containing cells which express a particular antibody and cells which do not express it is observed by utilizing a fluorescence antibody. In such a case, first the position of cell which is the observation target is confirmed by performing bright-field observation by using a low magnification lens, and then an appropriate observation target is selected by switching to fluorescence observation while keeping use of the low magnification lens to confirm whether or not the observation target emits fluorescence, thereafter performing detailed observation of the observation target by switching to an appropriate high-magnification lens.

Selecting a visual field which simultaneously contains cells that emit fluorescence and cells that do not emit fluorescence in an observation target which has been subjected to fluorescence observation at a high magnification is idealistic in scientific proof. For that purpose, acquiring images by finally switching to bright-field observation again while keeping use of the high magnification lens makes it possible to show a situation in which particular cells among a plurality of cells emit fluorescence, by off-line processing of a superposed image of a fluorescence image and a bright field image. In this way, by appropriately combining bright-field observation in addition to fluorescence image acquisition, the observation method to be performed by using the observation device of the present invention can be used not only in life science fields that address cells, tissues, and individuals, but also in various areas in which stereoscopic fluorescence observation is required.

Moreover, as described above, the same goes for the screening method to be performed by using the observation device of the present invention. Further, the stereoscopic reconstruction method to be performed to the object by using the multi-surface image acquisition system of the present invention also falls into the scope of the present invention.

For example, the present invention can be applied to acquisition of structure information on multiple cell clusters having a three-dimensional structure; analysis of spatial distribution of functions which differ from cell to cell (e.g. changes in intracellular environment, such as taking-in of a reagent and changes in calcium concentration) as well as quick screening thereof; and further analysis of three-dimensional movement of moving cells and organisms. Moreover, the present invention is effective not only in observation of cell population, but also in quickly grasping structure and region-specific functional information on an object having a complex three-dimensional shape.

Note that the present invention may be performed in such a way that the prism for side surface observation is combined with the prism for front surface observation such that image is formed in the same plane, and thereafter the image is guided to one light field camera to be observed, and in that case, the present invention can be applied to such a case as that quick inspection of a complex three-dimensional structure present in a very narrow lumen is desired to be performed without focusing operation.

EXAMPLES

Description of Examples will be supplemented by describing a part of summary and achievements of research and development work to have completed the present invention.

[Subject] Application of Chrovit® Prism in Fluorescence Microscope Observation of Cell: Development of Multi-Surface Image Acquisition System

[1] INTRODUCTION

There was no precedent of application of Chrovit® prism to fluorescence microscope observation of living cell. Example of the finally obtained Chrovit® prism of the present invention was designed such that an opening part was provided at the middle of the prism assembly, making it possible to directly observe an object through this opening part. It is a great merit in stereoscopic observation that an object can be directly confirmed without via a prism, and in addition, the fact that ordinary observation is possible will widen the application of the technique.

[2] START OF DESIGNING CHROVIT® PRISM

Upon designing a Chrovit® prism for fluorescence microscope observation of cell, it was assumed that the objective lens of the microscope was equivalent with a telecentric lens which was an optical system in which the central axis of the lens and principal ray between itself and the object were parallel, and there was no magnification change regardless of the distance to a subject. At that time, it was necessary to consider various parameters such as: the distance between the objective lens and the glass carrying a subject or a sample; the arrangement of the stage and the Chrovit® prism, particularly the arrangement of the length in the depth direction and the size of the opening part of the Chrovit® prism, and light flux and working distance of the lens; and the relation between the selection of lens etc. taking into consideration of the magnification and the number of visual fields of the lens, and actual field of view, and the size of the Chrovit® prism in the horizontal direction.

FIG. 10 shows a photograph to illustrate an outline of a 45° twice-reflection type prism which was the base of the initial design. On the left is a photograph of side view, and on the right is a photograph of bottom view, in which a ball pen tip was observed from below at an angle of 45°.

Actually, in an initially designed Chrovit® prism, an image of an object of a size which was supposed to be viewable through the opening part at the middle was obstructed, and only an image which was very dark and whose focus was blurred was obtained. When the light flux expanding in a circular cone shape from the subject crossed over the window portion at the central part of the Chrovit® prism, the amount of light of the image decreased and the focus thereof became blurred as well.

Further, to enable observation of a living cell, it was necessary to solve a wide range of problems such as: in what way the difference among the refractive index of air, water, and glass had influence on image acquisition; whether a practical design was possible in which an image of the entire Chrovit® prism came out in a range of the field of view of the lens; in what way the illumination method in bright-field observation should be selected; in what way the fluorescence excitation light should be guided to an subject; whether polishing of the surface was actually possible while the size of the entire prism needed to be decreased to adapt for microscope observation; whether bonding of prisms in such a way not to have influence on images was possible; whether ensuring accuracy of each prism, and assembly accuracy of the prism assembly was possible; and in what way the prism should be supported and held without having influence on acquisition of stereoscopic images.

In view of the above described matters, a simple twice-reflection type Chrovit® prism which was configured to look up a subject at an angle of 45° and observe the subject from two mutually orthogonal directions was fabricated as a multi-surface observation prism, and observation test of a subject was conducted by using a fluorescence microscope. The result revealed that some other images were superposed on a region in which only the subject was supposed to be viewable, and acquiring a clear image was difficult.

[3] IMPROVEMENT OF CHROVIT® PRISM—POLISHING

Then, to find out the causes thereof, a twice-reflection type Chrovit® prism was fabricated in which in addition to direct observation, observation in only one direction via the Chrovit® prism was performed. The result revealed theoretically the possibility that diffuse reflection from a wall of the prism, which was considered to be not in direct relation with the light path, had some influence. Then, whole surface polishing was performed on portions which were not in direct relation with the light path. Then, again, two of this improved twice-reflection type Chrovit® prisms were vertically bonded together to perform observation of a subject. The result revealed a state in which still some images were superposed on the subject.

[4] IMPROVEMENT OF CHROVIT® PRISM—TRANSPARENCY AND SUPPORTING PART STRUCTURE

Then, adhesive was decreased as much as possible so that the bonding surfaces of the two prisms had no influence on acquisition of images, and the bonding surface became transparent. Nevertheless, still some images overlapped the subject and no clear image was obtained. The overlapping image was considered, from its shape, to be the supporting structure for holding the Chrovit® prism. In order to eliminate its influence, such a structure as that the supporting structure can stably hold the prism assembly while being fully out of the visual field was considered.

FIG. 11 shows a bottom view, both side views, and a front view from a supporting structure side to show a Chrovit® prism and its supporting structure. When a bar-shaped supporting structure was directly attached to the prism block, although it was supposed to be deviated from the light path, in reality, it hindered image acquisition in any way. Then, an indirect supporting method was adopted, in which the prism block was once supported by a transparent glass block, and further a supporting bar was bonded to a position deviated from the center of the transparent block, thereby supporting the entire block. Such a configuration allowed to realize a prism structure in which visual field was not hindered.

Note that the above described holding method is an example and, in actual manufacturing, the Chrovit® prism may be held in another method. For example, while a Chrovit® prism can be provided in direct connection to a lens of an observation device such as a microscope and a scanner, the holding method of the Chrovit® prism in such a case may be such that the prism may be held in a manner to be floated in the air, or on the other hand, may be held in a manner to be directly fixed to the lens provided that it is located between the lens and the object. Thus, appropriate holding method and supporting method may be adopted.

[5] COMPLETION OF CHROVIT® PRISM

Based on each investigation and trial and error described above, a pass-through opening was provided in the middle part of the prism assembly, thus allowing direct observation of the object, and then four twice-reflection type prisms each of which looks up and observes the object at an elevation angle of 45° from four directions orthogonal to each other were bonded together in such a way to surround the middle part, thus forming a multi-surface observation prism (Chrovit® prism). Note that since, as a result of minimizing the amount of adhesive for bonding prisms together, the mechanical strength became insufficient, for reinforcement purpose, transparent adhesive was heaped up in a dot shape (hemisphere shape) on an upper part of the bonding surface of the prism upper surface (corresponding to the prism lower surface when being set to an inverted microscope), thereby ensuring strength of bonding.

Through these processes, finally, a Chrovit® prism which can be used for fluorescence microscope observation was completed. FIG. 12 shows each view (lower) to illustrate the configuration of a completed Chrovit® prism, and a cross sectional view (upper) of the twice-reflection type prism. Also FIG. 13 shows a photograph of the Chrovit® prism from respective different directions. This is a photograph to show a state in which the fabricated twice-reflection type Chrovit® prism assembly is disposed on a multi-well dish, and a target of a size of about 1 mm in the well is focused. The orientation of the prism and the dish is shown in an upside down relation to that of actual usage. A bar-shaped supporting structure for holding the prism appears from lower left to upper middle in the screen.

[6] SIMULTANEOUS MULTI-SURFACE OBSERVATION BY USE OF CHROVIT® PRISM

FIG. 14 shows a photograph to illustrate simultaneous multi-surface observation result using the completed Chrovit® prism. Also, FIG. 15 shows an expanded view of a middle part of FIG. 14. The image shown was captured via a lens with a magnification ×0.5 and an optical zooming system with a magnification ×2. In the simultaneous multi-surface observation image of an object by the completed twice-reflection type Chrovit® prism assembly illustrated in the figure, the image in the middle part is a direct image obtained by direct observation of an object. Moreover, four images in the surrounding are images of a subject looked up at an oblique angle of 45° from four different directions. In this way, it was confirmed that images of a total of five screens: front view, front, rear, left and right side views of an object viewed from the Chrovit® prism could be simultaneously observed, captured, and acquired.

[7] FLUORESCENCE STEREOSCOPIC OBSERVATION BY MULTI-SURFACE IMAGE ACQUISITION SYSTEM

Effects of a light field camera, which is another important element constituting the multi-surface image acquisition system of the present invention, are illustrated by a photograph.

FIG. 16 shows a photograph to illustrate a simultaneous multi-surface observation image of a subject by a Chrovit® prism. Moreover, FIG. 17 shows a photograph to illustrate the image of FIG. 16 after being processed by a light field camera. As the light field camera, R9-M-D-GE light field camera of Raytrix GmbH was used. Note that the Chrovit® prism used in these observations was of a type capable of six-surface simultaneous acquisition, and the object herein was a small paper piece. As illustrated, main focus is adjusted to an image obtained through a pass-through opening part in FIG. 16, and blur occurred in the remaining five surfaces. However, by processing by using the light field camera, it was possible to bring the entire screen into focus. That is, it was confirmed that the light field camera allowed simultaneous acquisition of image information (all-in-focus image) at various focal depths.

A test was conducted on whether or not fluorescence stereoscopic observation was possible by the multi-surface image acquisition system which was composed by combining the Chrovit® prism and the light field camera.

FIG. 18 shows a photograph to illustrate multi-surface fluorescence observation images of a subject by a multi-surface image acquisition system. Images shown in the figure are fluorescence images emitted by an object immersed in water in a multi-well dish, and taken by a light field camera, in which A, B, and C show a green fluorescence image, a red fluorescence image, and a merged image of the both, respectively. The object present in water was properly excited, and fluorescence having different light path lengths emitted from the object was acquired in one image capturing operation by using the twice-reflection type Chrovit® prism assembly and the R9-M-D-GE light field camera of Raytrix GmbH, thereafter being displayed as an all-in-focus image. Observation was made through an objective lens with a magnification ×0.5, and an optical zooming system with a magnification ×4.

As illustrated, it was proved that simultaneous object observation and image acquisition from multiple directions by use of fluorescence is possible. Note that FIG. 19 shows a photograph to illustrate multi-surface fluorescence observation images of another object by the multi-surface image acquisition system. Shown in the figure are all-in-focus images which were obtained by dyeing fiber with mixtures of fluorescence D-glucose derivative 2-NBDG, and fluorescence L-glucose derivative 2-TRLG, thereafter washing it with distilled water, introducing it into 96 hole multi-well dish, and capturing images thereof by using the Chrovit® prism assembly and the above described light field camera. Here, it was confirmed that simultaneous object observation or image acquisition from multiple directions by use of fluorescence was possible. Moreover, it was confirmed that bright images could be acquired.

[8] CONCLUSION

The multi-surface image acquisition system, observation device, observation method, and the like of the present invention can be applied to inverted-type microscopes or scanners, as well as to upright type microscopes and scanners. Also, as described above, the present invention may be configured to be used with the surface of the prism being protected as needed by an appropriate material such as glass and film which has no optical influence. The application range of the present invention is wide, and the entire system will become simple, thus exhibiting excellent space utility such as that, for example, although conventionally four observation devices from four directions are used to simultaneously observe an object, such observation will become possible with two or one observation device.

Moreover, if the objective is focused, focusing can be done with only one operation, allowing quick observation. Even in observation or the like of an object having a size and an image capturing range beyond the depth of field of the lens, it is possible to minimize adjustment of depth of focus. Moreover, the present invention can be freely combined with tomographic imaging, in such a case, the number of imaging can be dramatically reduced. Moreover, incorporating the present invention into an existing microscope observation device easily allows multi-direction observation. Further, the fact that observation can be performed in non-contact is also significant merit of the present invention, and by moving an XY stage carrying an object, it is possible to perform scanning of multiple objects quickly and easily.

[9] SUPPLEMENTATION

The multi-surface image acquisition system in Example utilized a twice-reflection type prism which observed a subject by looking up it at an elevation angle of 45°. That is, it was designed such that the elevation angle was 45° in the air. When this was used in a water solution, the object would be looked up at an angle steeper than 45°. Accordingly, a design example was contrived such that the object was looked up at 45° even in the water solution.

FIG. 20 is an explanatory diagram to show a design example of the Chrovit® prism when an observation target in a water solution was looked up at an angle of 45° in the water solution during multi-surface fluorescence observation of an object by a multi-surface image acquisition system. In this example, the visual field range was limited to 1 mm square, and the Chrovit® prisms were combined such that the observation target in the water solution was able to be looked up at 45° in the water solution.

FIG. 21 shows a photograph to illustrate fluorescence intensity enhancement effect by the multi-surface image acquisition system. The same object which emits fluorescence was irradiated by fluorescence excitation light of the same intensity and was compared. In the figure, A indicates a fluorescence observation image when the Chrovit® prism was not used, B indicates a fluorescence observation image when the Chrovit® prism was used, and C indicates a bright-field image of an observation target obtained through the Chrovit® prism. As shown by these, it was confirmed that fluorescence intensity was enhanced by using the Chrovit® prism according to the present invention.

INDUSTRIAL APPLICABILITY

Since the multi-surface image acquisition system, observation device, observation method, screening method and stereoscopic reconstruction method of an object of the present invention are configured as described above, it is possible, according to this, to acquire image information on an object observed from multiple directions at a time in observation, image acquisition, and structural evaluation of an object having a three-dimensional structure, including cell observation, thereby allowing quick grasping and evaluation of structure in a simple and practical configuration. Therefore, this is an invention with high industrial applicability in all the areas where observation of three-dimensional structure including medicine/biochemistry fields is needed, and all related areas.

The invention claimed is:
1. An optical system for simultaneous imaging of an associated three-dimensional object from multiple directions, comprising:
a prism assembly comprising a plurality of prisms configured to provide a pass through opening, wherein the pass through opening allows a direct imaging of the associated object positioned on an object side of the prism assembly, wherein the prism assembly has a light path formed so as to converge multiple images of the associated object that are obtained from the multiple directions of imaging of the associated object, into a single direction, wherein a light path length correction is made utilizing a difference between a refractive index of a glass of the prism assembly and of air located adjacent the prism assembly to equalize a working distance for each direction of imaging of the associated object;
a light field camera, positioned on an observation side of the prism assembly, for expanding a focal-length adjustment range of the multiple images of the associated object, which images are incident on an incident plane, via the prism assembly; and,
a beam splitter positioned between the prism assembly and the light field camera, wherein the beam splitter reflects excitation light to illuminate the associated object, and transmits emitted images of the associated object to the light field camera;
wherein both a fluorescence excitation and a fluorescence observation of the associated object are performed through the prism assembly.

2. The optical system of claim 1 wherein the prism assembly includes at least two twice reflection prisms, which are configured to emit incident light after reflecting it twice internally and wherein the at least two twice reflection prisms are bonded together.

3. The optical system of claim 2 wherein the prism assembly includes four twice reflection prisms which cooperate to encircle the pass through opening in the prism assembly.

4. The optical system of claim 3 wherein the prism assembly enables five images of the associated object to be captured simultaneously.

5. The optical system of claim 2 wherein each boundary surface of the at least two prisms is polished.

6. The optical system of claim 1 wherein the beam splitter comprises a dichroic mirror.

7. The optical system of claim 1 wherein the beam splitter comprises at least one of a liquid crystal tunable device and an acoustic tunable device.

8. The optical system of claim 1 further comprising a lens construction located adjacent the prism assembly.

9. The optical system of claim 1 wherein the prism assembly, the beam splitter, and the light field camera are linearly aligned to provide a linearly aligned combination.

10. The optical system of claim 9 further comprising a light source positioned to one side of the linearly aligned combination.

11. The optical system of claim 1 further comprising at least one of a microscope and a scanner.

12. The optical system of claim 1 further comprising a transparent structure located on the object side of the prism assembly for supporting the associated three dimensional object.

13. An optical system for simultaneous imaging of an associated three-dimensional object from multiple directions, comprising:
a prism assembly comprising a plurality of prisms configured to provide a pass through opening, wherein the pass through opening allows a direct imaging of the associated object and the prism assembly has a light path formed so as to converge multiple images of the associated object that are obtained from the multiple directions of imaging of the associated object, into a single direction, wherein a light path length correction is made utilizing a difference between a refractive index of a glass of the prism assembly and of air located adjacent the prism assembly to equalize a working distance for each direction of imaging of the associated object;
a light field camera, spaced from the prism assembly, for expanding a focal-length adjustment range of the multiple images of the associated object, which images are incident on an incident plane, via the prism assembly; and, a beam splitter positioned between the prism assembly and the light field camera, wherein the beam splitter reflects excitation light to illuminate the associated object, and transmits emitted images of the associated object to the light field camera;

wherein both a fluorescence excitation and a fluorescence observation of the associated object are performed through the prism assembly.

14. The optical system of claim 13 wherein the prism assembly includes at least two twice reflection prisms, which are configured to emit incident light after reflecting it twice internally and wherein the at least two twice reflection prisms are bonded together.

15. The optical system of claim 14 wherein each boundary surface of the at least two prisms is polished.

16. The optical system of claim 14 wherein the prism assembly includes four twice reflection prisms which cooperate to encircle the pass through opening in the prism assembly.

17. The optical system of claim 16 wherein the prism assembly enables five images of the associated object to be captured simultaneously.

18. The optical system of claim 13 wherein the beam splitter comprises a dichroic mirror.

19. The optical system of claim 13 wherein the beam splitter comprises at least one of a liquid crystal tunable device and an acoustic tunable device.

20. The optical system of claim 13 further comprising a lens construction located adjacent the prism assembly.

21. The optical system of claim 13 wherein the prism assembly, the beam splitter, and the light field camera are linearly aligned to define a linearly aligned combination.

22. The optical system of claim 21 further comprising a light source positioned to one side of the linearly aligned combination.

23. The optical system of claim 13 further comprising at least one of a microscope and a scanner.

* * * * *